(12) United States Patent
Shimokawa et al.

(10) Patent No.: US 11,949,290 B2
(45) Date of Patent: Apr. 2, 2024

(54) MOTOR THAT SUPPRESSES DEMAGNETIZATION OF PERMANENT MAGNET, FAN, AND AIR CONDITIONER

(71) Applicant: Mitsubishi Electric Corporation, Tokyo (JP)

(72) Inventors: Takaya Shimokawa, Tokyo (JP); Hiroki Aso, Tokyo (JP); Ryogo Takahashi, Tokyo (JP); Kazuma Nomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 598 days.

(21) Appl. No.: 17/059,511

(22) PCT Filed: Jun. 27, 2018

(86) PCT No.: PCT/JP2018/024407
§ 371 (c)(1),
(2) Date: Nov. 30, 2020

(87) PCT Pub. No.: WO2020/003414
PCT Pub. Date: Jan. 2, 2020

(65) Prior Publication Data
US 2021/0211003 A1 Jul. 8, 2021

(51) Int. Cl.
*H02K 1/276* (2022.01)
*H02K 1/2746* (2022.01)
(Continued)

(52) U.S. Cl.
CPC ............... *H02K 1/276* (2013.01); *H02K 1/28* (2013.01); *H02K 7/14* (2013.01); *H02K 9/06* (2013.01);
(Continued)

(58) Field of Classification Search
CPC ........ H02K 1/27; H02K 1/276; H02K 1/2706; H02K 1/272; H02K 1/274; H02K 1/2753;
(Continued)

(56) References Cited

U.S. PATENT DOCUMENTS 5,666,015 A     9/1997  Uchibori et al.
6,424,871 B1 *  7/2002  Nakajima ............... H02K 11/33
                                                          700/275

(Continued)

FOREIGN PATENT DOCUMENTS

CN      104081630 A      10/2014
JP      2001-178046 A    6/2001
(Continued)

OTHER PUBLICATIONS

Office Action dated Oct. 20, 2022 in corresponding KR Patent Application No. 10-2020-7036435 (with English translation).
(Continued)

*Primary Examiner* — Eric Johnson
(74) *Attorney, Agent, or Firm* — POSZ LAW GROUP, PLC

(57) ABSTRACT

A motor includes a rotor and a stator provided to surround the rotor. The rotor has a rotor core having a magnet insertion hole and a permanent magnet disposed in the magnet insertion hole and is rotatable about a rotation axis. The stator has a stator core with a tooth facing the rotor, and a coil wound around the tooth. The permanent magnet has a thickness thicker than or equal to 2.1 mm in a direction in which the permanent magnet faces the stator and is magnetized in a direction of the thickness. A minimum gap AG (mm) between the rotor and the stator, a winding number Nt of the coil around the tooth, an overcurrent threshold Ip (A)

(Continued)

for a current flowing through the coil, and a lower limit Hct (kA/m) of a coercive force of the permanent magnet satisfy $Hct \geq 0.4 \times (Ip \times Nt/AG) + 410$.

13 Claims, 13 Drawing Sheets

(51) Int. Cl.
  *H02K 1/28* (2006.01)
  *H02K 7/14* (2006.01)
  *H02K 9/06* (2006.01)
  *H02K 11/33* (2016.01)
(52) U.S. Cl.
  CPC ............ *H02K 11/33* (2016.01); *H02K 1/2746* (2013.01); *H02K 2213/03* (2013.01)
(58) Field of Classification Search
  CPC .......... H02K 1/2746; H02K 1/28; H02K 1/30; H02K 7/14; H02K 9/06; H02K 11/30; H02K 11/33; H02K 2213/03
  See application file for complete search history.

(56) References Cited

U.S. PATENT DOCUMENTS

| | | | |
|---|---|---|---|
| 2004/0145263 A1* | 7/2004 | Kojima | H02K 1/276 310/156.56 |
| 2015/0084468 A1 | 3/2015 | Nigo et al. | |
| 2016/0254713 A1 | 9/2016 | Yamaguchi et al. | |
| 2018/0219438 A1* | 8/2018 | Oikawa | H02K 1/2746 |
| 2018/0248419 A1 | 8/2018 | Nigo et al. | |
| 2018/0248428 A1* | 8/2018 | Nigo | F25B 31/026 |
| 2019/0028053 A1 | 1/2019 | Akutsu et al. | |
| 2019/0173337 A1 | 6/2019 | Shimokawa et al. | |

FOREIGN PATENT DOCUMENTS

| | | | | |
|---|---|---|---|---|
| JP | 2004-173415 A | 6/2004 | | |
| JP | 2004-260926 A | 9/2004 | | |
| JP | 2013-162557 A | 8/2013 | | |
| JP | 5646119 B1 | 12/2014 | | |
| JP | 2015-062338 A | 4/2015 | | |
| JP | 2015-159691 A | 9/2015 | | |
| JP | 2017-028862 A | 2/2017 | | |
| JP | 2017-055504 A | 3/2017 | | |
| JP | 2017-153356 4 | 8/2017 | | |
| KR | 10-2018-0044976 A | 5/2018 | | |
| WO | 2017-077590 A1 | 5/2017 | | |
| WO | WO-2017077580 A1 * | 5/2017 | .......... | F04C 29/0085 |
| WO | WO-2017085814 A1 * | 5/2017 | .............. | F25B 31/00 |
| WO | 2017/158680 A1 | 9/2017 | | |
| WO | 2018/011979 A1 | 1/2018 | | |

OTHER PUBLICATIONS

Foster, S.N. "Operation of interior permanent magnet synchronous machines with fractional slot concentrated windings under both healthy and faulty conditions", 2013, pp. 1-2, 44-46.

Notice of Reasons for Revocation of a Patent dated Dec. 1, 2022 in connection with counterpart Japanese Patent No. 7038819.

Office Action dated Aug. 1, 2021 issued in corresponding IN patent application No. 202027055063.

Office Action dated Mar. 10, 2023 in connection with counterpart Chinese Patent Application No. 201880094688.0 (and English machine translation).

Notice of Reasons for Revocation of a Patent dated Apr. 24, 2023 in connection with counterpart Japanese Patent No. 7038819.

Notice of Final Rejection dated Apr. 26, 2023 in connection with counterpart Korean Patent Application No. 10-2020-7036435 ( and English machine translation).

* cited by examiner

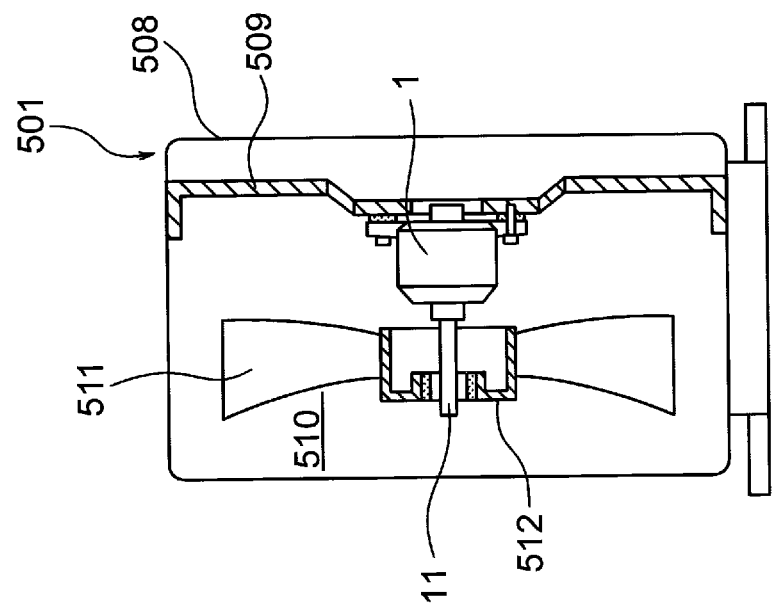
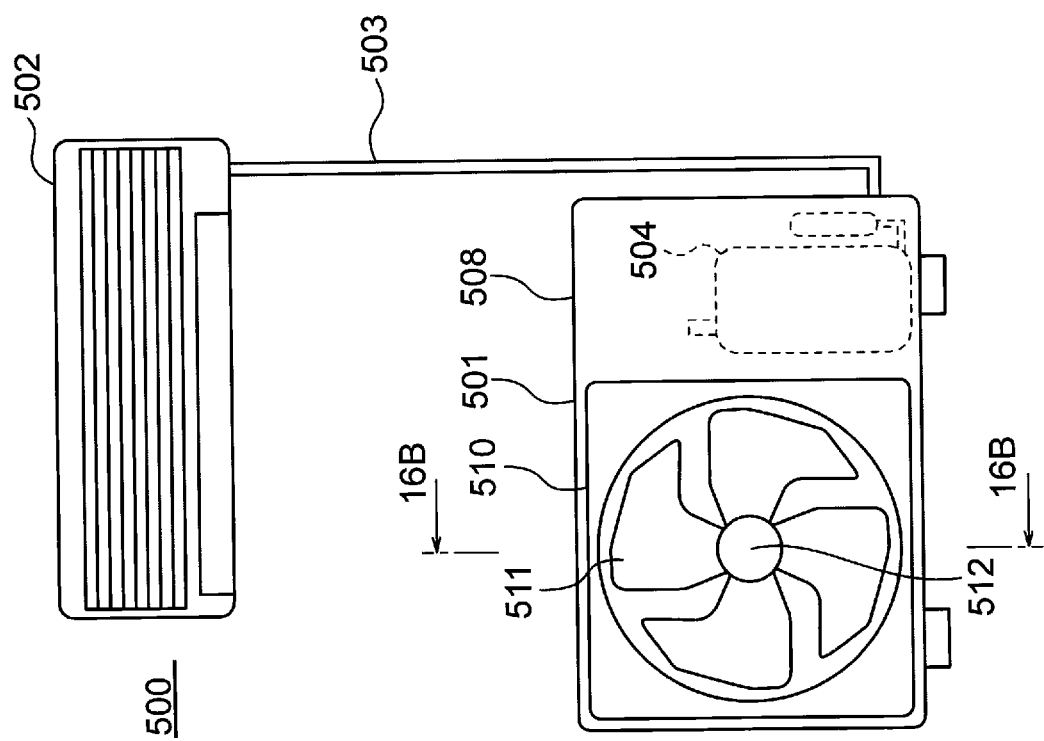

MOTOR THAT SUPPRESSES DEMAGNETIZATION OF PERMANENT MAGNET, FAN, AND AIR CONDITIONER

CROSS REFERENCE TO RELATED APPLICATION

This application is a U.S. national stage application of International Application No. PCT/JP2018/024407 filed on Jun. 27, 2018, the contents of which are incorporated herein by reference.

TECHNICAL FIELD

The present invention relates to a motor, a fan, and an air conditioner.

BACKGROUND

Conventionally, a motor in which a permanent magnet is attached to a rotor and a coil is attached to a stator is widely used (see, for example, Patent Reference 1). In such a motor, demagnetization of the permanent magnet may be caused by a magnetic flux generated in the coil of the stator.

PATENT REFERENCE

Patent Reference 1
Japanese Patent Application Publication No. 2001-178046 (see FIGS. 1 and 2)

In general, as the thickness of the permanent magnet increases, the demagnetization of the permanent magnet is less likely to occur, but a use amount of permanent magnet material increases and thus the manufacturing cost increases. On the other hand, when the thickness of the permanent magnet is made extremely thin, the use amount of permanent magnet material is reduced, but the price per unit weight of the permanent magnet increases due to an increase in the processing cost. This results in an increase in manufacturing cost.

The present invention is intended to solve the above-described problems, and an object of the present invention is to suppress the demagnetization of a permanent magnet while reducing the manufacturing cost.

SUMMARY

A motor of the present invention includes a rotor having a rotor core having a magnet insertion hole, and a permanent magnet disposed in the magnet insertion hole, the rotor being rotatable about a rotation axis, and a stator provided so as to surround the rotor, the stator having a stator core having a tooth facing the rotor, and a coil wound around the tooth. The permanent magnet has a thickness thicker than or equal to 2.1 mm in a direction in which the permanent magnet faces the stator and is magnetized in a direction of the thickness. A minimum gap AG (mm) between the rotor and the stator, a winding number Nt of the coil around the tooth, an overcurrent threshold Ip (A) for a current flowing through the coil, and a lower limit Hct (kA/m) of a coercive force of the permanent magnet satisfy $Hct \geq 0.4 \times (Ip \times Nt/AG) + 410$.

A motor of the present invention includes a rotor having a rotor core having a magnet insertion hole, and a permanent magnet disposed in the magnet insertion hole, the rotor being rotatable about a rotation axis, and a stator provided so as to surround the rotor, the stator having a stator core having a tooth facing the rotor, and a coil wound around the tooth. The permanent magnet has a thickness thicker than or equal to 3 mm in a direction in which the permanent magnet faces the stator and is magnetized in a direction of the thickness. The thickness of the permanent magnet is thicker than or equal to 3 mm. A minimum gap AG (mm) between the rotor and the stator, a winding number Nt of the coil around the tooth, an overcurrent threshold Ip (A) for a current flowing through the coil, and a lower limit Hct (kA/m) of a coercive force of the permanent magnet satisfy $Hct \geq 0.32 \times (Ip \times Nt/AG) + 350$.

According to the present invention, the demagnetization of the permanent magnet can be suppressed while reducing the manufacturing cost by reducing the price per unit weight of the permanent magnet.

BRIEF DESCRIPTION OF THE DRAWINGS

FIG. 16(A) is a front view illustrating an air conditioner to which the motor of each embodiment is applied, and FIG. 16(B) is a cross-sectional view illustrating an outdoor unit of the air conditioner.

DETAILED DESCRIPTION

First Embodiment (Configuration of Motor)

Figure 1:
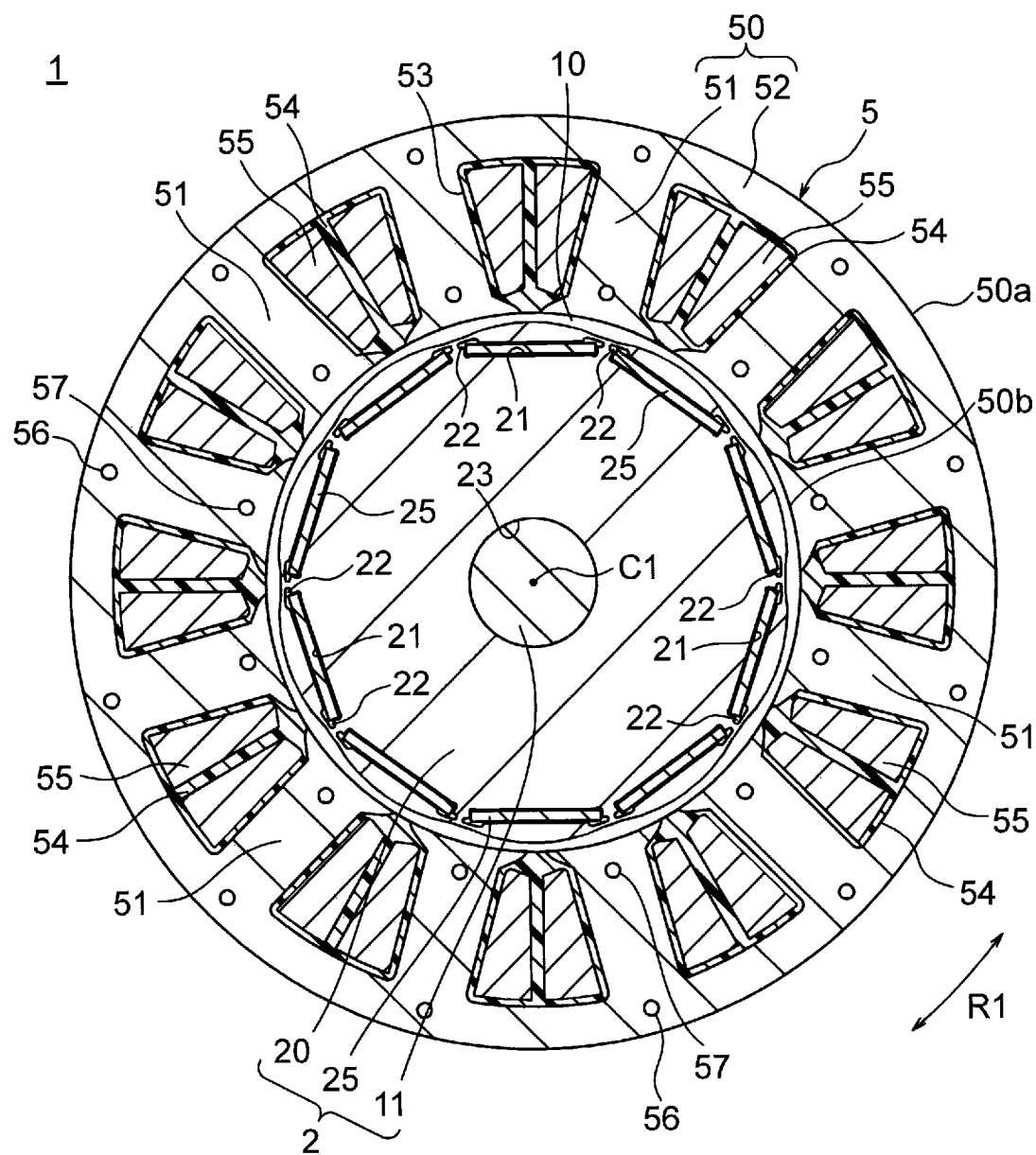
FIG. 1 is a cross-sectional view illustrating a motor of a first embodiment.

FIG. 1 is a cross-sectional view illustrating a motor 1 of a first embodiment. The motor 1 is an inner-rotor type motor that includes a rotatable rotor 2 and an annular stator 5 provided so as to surround the rotor 2. The motor 1 is also a permanent magnet embedded motor in which permanent magnets 25 are embedded in the rotor 2. An air gap (clearance) 10 of, for example, 0.4 mm is provided between the rotor 2 and the stator 5.

Hereinafter, an axis serving as a rotational center of the rotor 2 is referred to as a rotation axis C1, and a direction of the rotation axis C1 is referred to as an "axial direction". A circumferential direction about the rotation axis C1 (indicated by the arrow R1 in FIG. 1) is referred to as a "circumferential direction", and a radial direction about the rotation axis C1 is referred to as a "radial direction". FIG. 1 is a cross-sectional view of the motor at a plane perpendicular to the rotation axis C1 of the rotor 2.

(Configuration of Stator)

The stator 5 includes a stator core 50 and a coil 55 wound on the stator core 50. The stator core 50 is formed of a plurality of magnetic stack elements each having a thickness of, for example, 0.2 mm to 0.5 mm, which are stacked in the axial direction and fixed together by crimping or the like. In this example, the stack element is an electromagnetic steel sheet that contains iron (Fe) as a main component.

The stator core 50 has a yoke 52 having an annular shape about the rotation axis C1 and a plurality of teeth 51 extending inward in the radial direction (i.e., toward the rotation axis C1) from the yoke 52. The teeth 51 are arranged at equal intervals in the circumferential direction. The number of teeth 51 is 12 in this example but is not limited to 12. A slot 53 which is a space for accommodating the coil 55 is formed between adjacent teeth 51.

A tip end of the tooth 51 on the inner side in the radial direction has a wider width in the circumferential direction than other portions of the tooth 51. The tip end of the tooth 51 faces an outer circumference of the rotor 2 via the air gap 10 described above. Each of an outer circumference 50a of the stator core 50 (i.e., an outer circumference of the yoke 52) and an inner circumference 50b of the stator core 50 (i.e., the tip end of the tooth 51) has a circular annular shape.

Crimping portions for integrally fixing the stack elements of the stator core 50 are formed in the yoke 52 and the teeth 51 of the stator core 50, as indicated by reference characters 56 and 57. The crimping portions may be formed in any other position as long as the stack elements are integrally fixed by the crimping portions.

An insulator 54 serving as an insulating portion is attached to the stator core 50. The insulator 54 is interposed between the stator core 50 and the coil 55 and insulates the stator core 50 and the coil 55 from each other. The insulator 54 is formed by integrally molding a resin with the stator core or assembling a resin molded body which is molded as a separate component, to the stator core 50.

The insulator 54 is formed of an insulating resin such as polybutylene terephthalate (PBT), polyphenylene sulfide (PPS), liquid crystal polymer (LCP), or polyethylene terephthalate (PET). The insulator 54 may be formed of an insulating resin film that has a thickness of 0.035 to 0.4 mm.

The coil 55 is wound around the tooth 51 via the insulator 54. The coil 55 is formed of a material that contains copper or aluminum as a main component. The coil 55 is wound around each tooth 51 (concentrated winding). It is also possible to fill the slot 53 with a resin (for example, the same resin as that of the insulator 54) to surround the coil 55.

(Configuration of Rotor)

Figure 2:
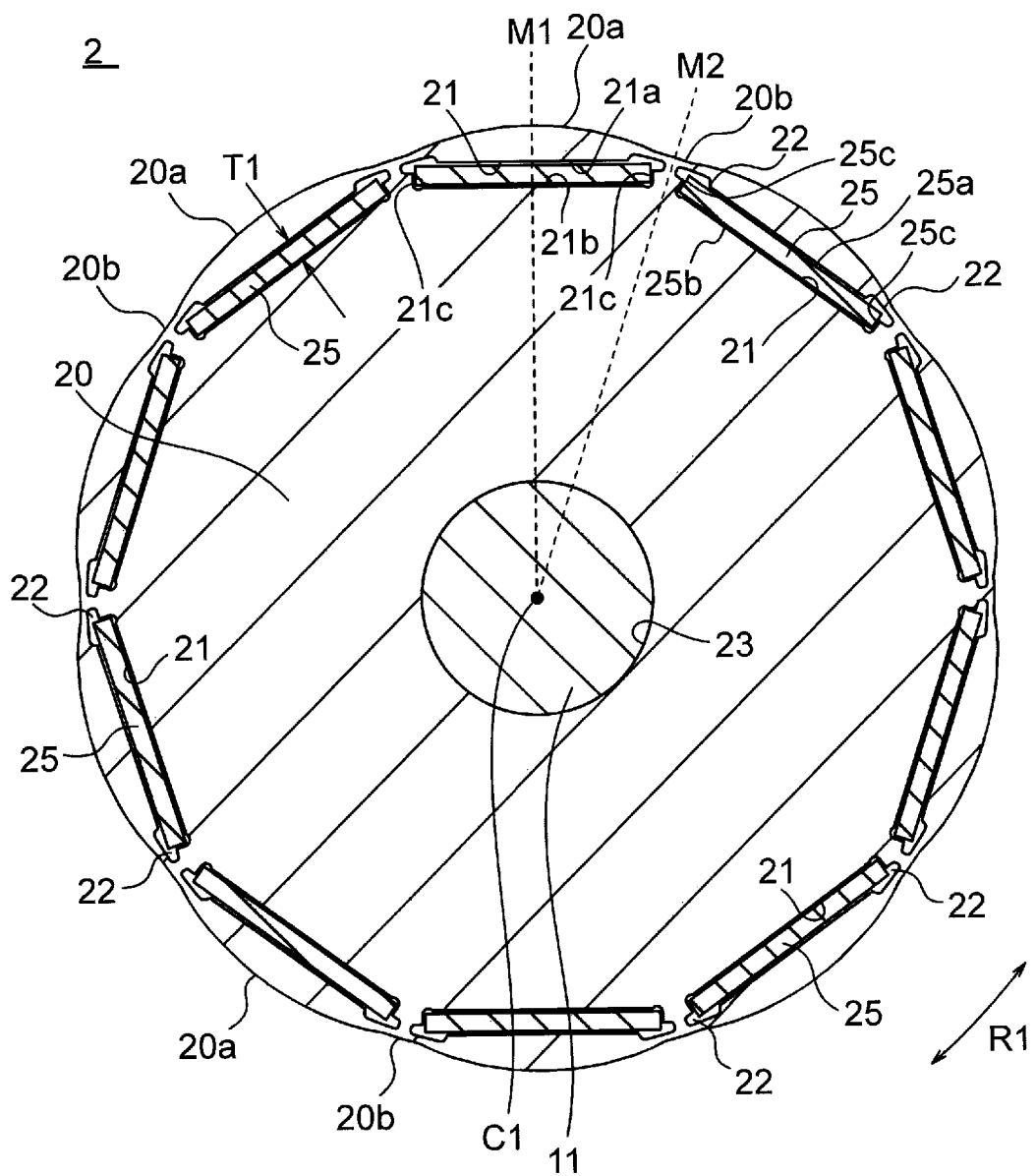
FIG. 2 is a cross-sectional view illustrating a rotor of the first embodiment.

FIG. 2 is a cross-sectional view illustrating the rotor 2. The rotor 2 has a rotor core 20 having a cylindrical shape about the rotation axis C1. The rotor core 20 is formed of a plurality of magnetic stack elements each having a thickness of 0.2 to 0.5 mm, which are stacked in the axial direction and fixed together by crimping or the like. In this example, the stack element is an electromagnetic steel sheet that contains iron as a main component. The rotor core 20 may be formed of a resin core that contains a combination of a soft magnetic material and a resin. A diameter of the rotor 2 is 50 mm in this example.

Figure 14:
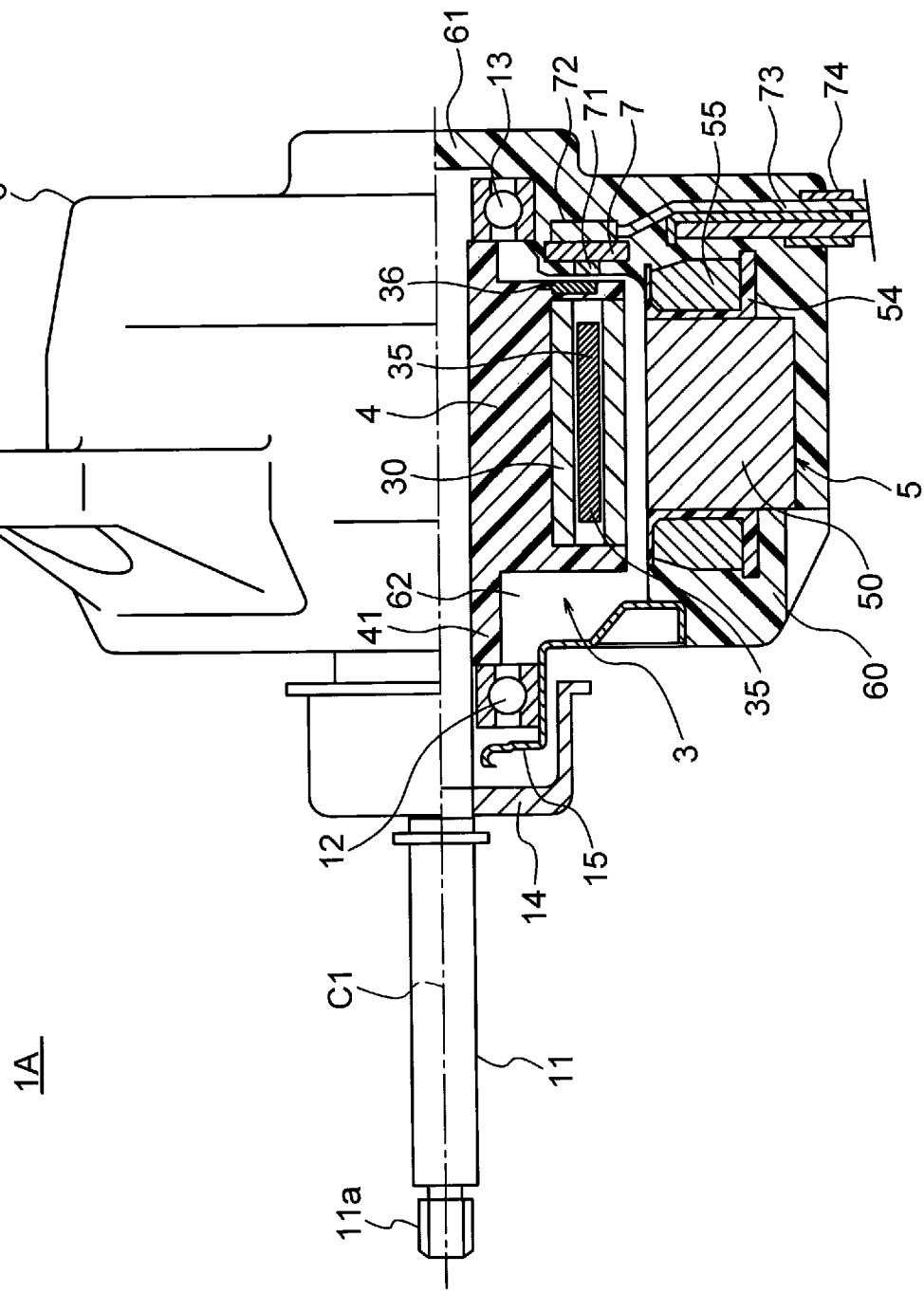
FIG. 14 is a longitudinal sectional view illustrating a motor of the second embodiment.

The rotor core 20 has a central hole 23 at its center in the radial direction. The central hole 23 is a shaft insertion hole that passes through the rotor core 20 in the axial direction and has a circular cross section. A rotation shaft 11 is fixed inside the central hole 23 and is rotatably supported by bearings 12 and 13 (FIG. 14). The rotation axis C1 is a central axis of the rotation shaft 11. The rotation shaft 11 is formed of metal such as iron (Fe), nickel (Ni), chromium (Cr) or the like.

A plurality of magnet insertion holes 21 are formed along an outer circumferential surface of the rotor core 20. The magnet insertion holes 21 are arranged at equal intervals in the circumferential direction. Each magnet insertion hole 21 has an elongated shape in the circumferential direction and passes through the rotor core 20 in the axial direction. The number of magnet insertion holes 21 is ten in this example but is not limited to ten.

The magnet insertion hole 21 extends linearly in a direction perpendicular to a straight line (also referred to as a magnetic pole center line) that passes through the rotation axis C1 and a pole center M1 to be described later. The magnet insertion hole 21 has an outer-side end portion 21a which is an end portion on the outer side in the radial direction, an inner-side end portion 21b which is an end portion on the inner side in the radial direction, and side end portions 21c which are both end portions in the circumferential direction.

A permanent magnet 25 is disposed in each magnet insertion hole 21. The permanent magnet 25 is a member in the form of a flat-plate and has a thickness T1 in a direction in which the permanent magnet 25 faces the stator 5 (more specifically, in the radial direction of the rotor core 20). The permanent magnet 25 is formed of, for example, a rare earth magnet that contains neodymium (Nd) or samarium (Sm), as a main component. The permanent magnet may be formed of a ferrite magnet that contains iron as a main component, in place of the rare earth magnet.

The permanent magnet 25 is magnetized (in other words, has anisotropy) in a thickness direction. The permanent magnets 25 adjacent to each other in the circumferential direction are arranged so that pole-faces of opposite polarities face the outer circumferential side of the rotor core 20.

The permanent magnet 25 disposed in each magnet insertion hole 21 constitutes a magnetic pole. Thus, the number of magnetic poles of the rotor 2 is ten. However, the number of magnetic poles of the rotor 2 is not limited to ten. A center of the magnet insertion hole 21 in the circumferential direction is the pole center M1. A boundary between the adjacent magnet insertion holes 21 is an inter-pole portion M2.

The permanent magnet 25 has an outer-side end portion 25a which is an end portion on the outer side in the radial direction, an inner-side end portion 25b which is an end portion on the inner side in the radial direction, and side end portions 25c which are both end portions in the circumferential direction. The outer-side end portion 25a of the permanent magnet 25 faces the outer-side end portion 21a of the magnet insertion hole 21, while the inner-side end portion 25b of the permanent magnet 25 faces the inner-side end portion 21*b* of the magnet insertion hole 21. The side end portions 25*c* of the permanent magnet 25 face the side end portions 21*c* of the magnet insertion hole 21.

Although one permanent magnet 25 is disposed in each magnet insertion hole 21 in this example, a plurality of permanent magnets 25 may be disposed side by side in the circumferential direction in each magnet insertion hole 21. In this case, the magnet insertion hole 21 may be formed in a V shape so that its center in the circumferential direction protrudes inward in the radial direction.

A flux barrier (i.e., a leakage magnetic flux suppression hole) 22 is formed on each of both sides of the magnet insertion hole 21 in the circumferential direction. Each flux barrier 22 has a first portion 22*a* (FIG. 4) extending from the outer-side end portion 21*a* of the magnet insertion hole 21 outward in the radial direction, and a second portion 22*b* (FIG. 4) extending from the side end portion 21*c* of the magnet insertion hole 21 toward the inter-pole portion M2 side.

A core portion between the flux barrier 22 and the outer circumference of the rotor core 20 is a thin-walled portion (also referred to as a bridge portion). A thickness of the thin-walled portion is desirably the same as the thickness of each of the stack elements constituting the rotor core 20. This makes it possible to suppress the leakage magnetic flux between the adjacent magnetic poles. The flux barrier 22 is disposed on each of both sides of the magnet insertion hole 21 in the circumferential direction but may be disposed only on one side of the magnet insertion hole 21 in the circumferential direction.

Figure 3:
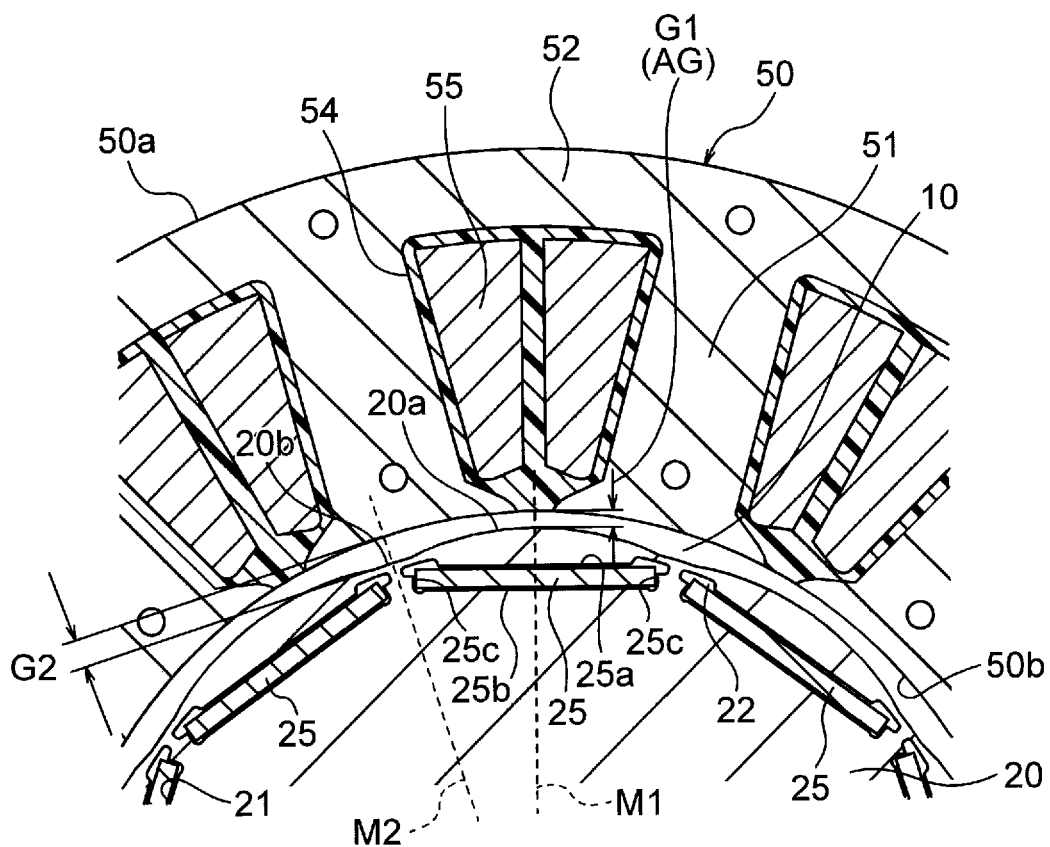
FIG. 3 is an enlarged cross-sectional view illustrating a part of the motor of the first embodiment.

FIG. 3 is an enlarged cross-sectional view illustrating a part of the motor 1. The rotor core 20 has a flower shape whose outer diameter is maximum at the pole center M1 and is minimum at the inter-pole portion M2. Meanwhile, the inner circumference 50*b* of the stator core 50 has a circular annular shape. Thus, a gap between the rotor 2 and the stator 5 (i.e., a width of the air gap 10) has a minimum value G1 at the pole center M1 and a maximum value G2 at the inter-pole portion M2. The minimum value G1 of the gap between the rotor 2 and the stator 5 is referred to as a minimum gap AG between the rotor 2 and the stator 5.

Figure 4:
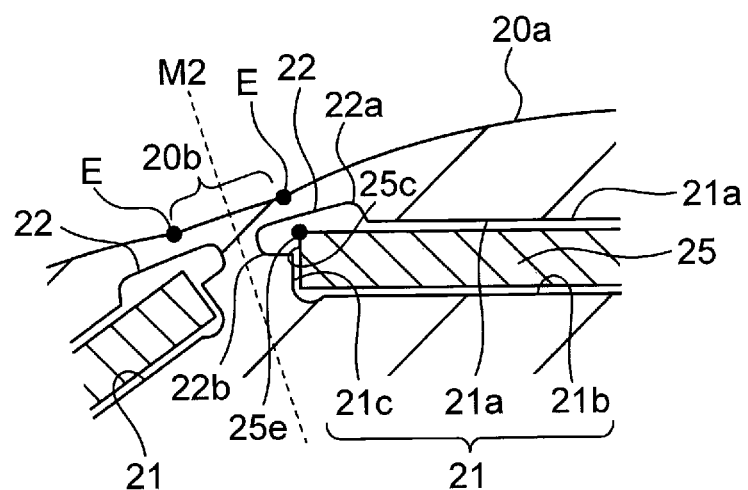
FIG. 4 is an enlarged schematic diagram illustrating a portion including an inter-pole portion of the rotor of the first embodiment.

FIG. 4 is an enlarged diagram illustrating a portion including the inter-pole portion M2 of the rotor 2. The outer circumference of the rotor core 20 has an outer circumferential portion 20*a* including the pole center M1 and an outer circumferential portion 20*b* including the inter-pole portion M2. Both of the outer circumferential portions 20*a* and 20*b* are arc-shaped portions having centers of curvature on the rotation axis C1 side but have different radii of curvature. In this example, a border E between the outer circumferential portion 20*a* and the outer circumferential portion 20*b* is located on the outer side of the flux barrier 22 in the radial direction.

Figure 5:
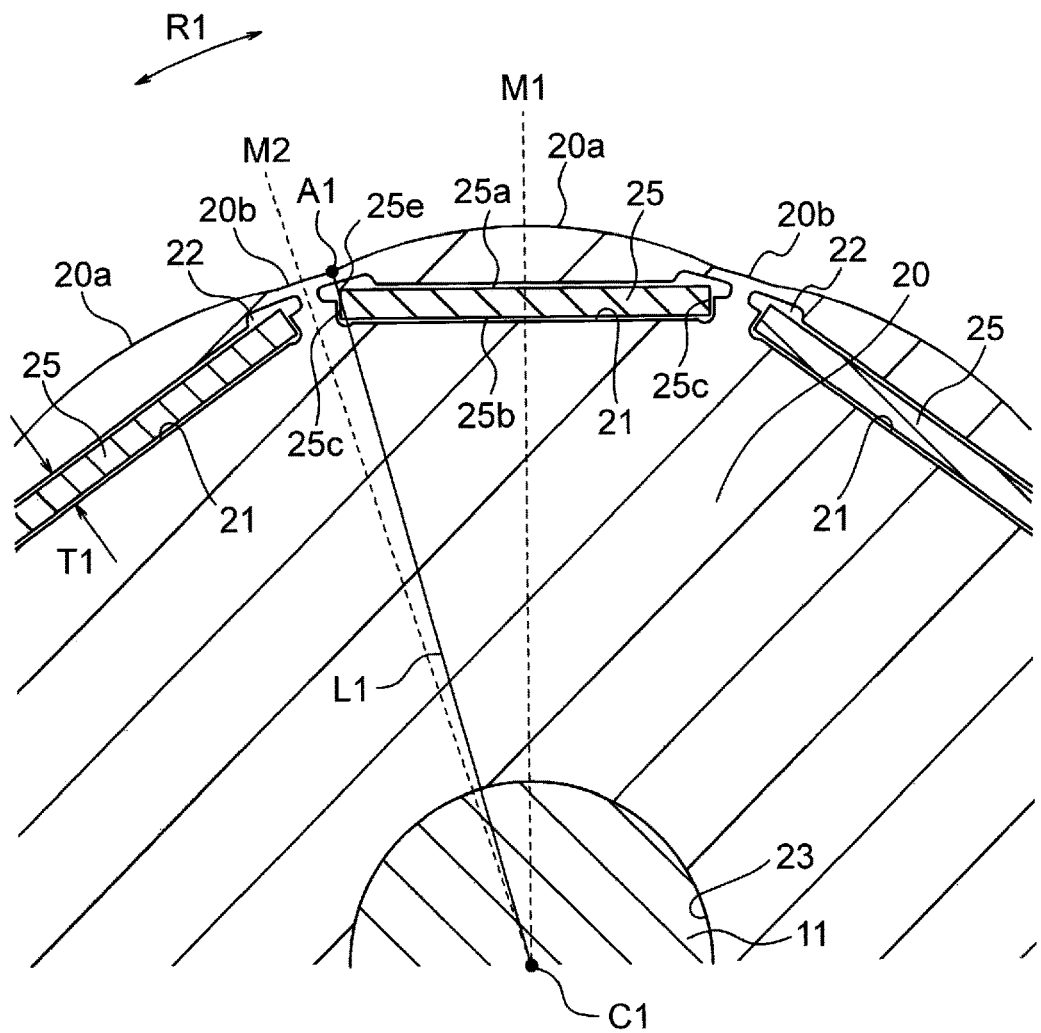
FIG. 5 is an enlarged cross-sectional view illustrating a part of the rotor of the first embodiment.

FIG. 5 is an enlarged cross-sectional view illustrating a part of the rotor 2. In the outer circumference of the rotor core 20, a distance from the inner circumference 50*b* of the stator 5 (FIG. 3) to the outer circumferential portion 20*b* including the inter-pole portion M2 is longer than a distance from the inner circumference 50*b* to the outer circumferential portion 20*a* including the pole center M1. That is, the outer circumferential portion 20*b* faces the air gap 10 which is wider than that the outer circumferential portion 20*a* faces.

A point A1 as a first point is defined on the outer circumferential portion 20*b*. The side end portion 25*c* of the permanent magnet 25 (i.e., the end portion in the circumferential direction) is disposed on a straight line L1 connecting the point A1 and the rotation axis C1. The outer circumferential portion 20*b* of the rotor core 20 is at a longer distance from the stator 5. Thus, by disposing the side end portion 25*c* of the permanent magnet 25 on the straight line L1, a magnetic flux from the stator 5 (also referred to as a stator magnetic flux) is less likely to flow to the side end portion 25*c* of the permanent magnet 25. Although the side end portion 25*c* of the permanent magnet 25 is a portion which is more likely to be demagnetized, the demagnetization of the side end portion 25*c* can be made less likely to occur by disposing the side end portion 25*c* of the permanent magnet 25 as above.

An outer corner 25*e*, which is the corner of the side end portion 25*c* of the permanent magnet 25 on the outer side in the radial direction, is more desirably disposed on the straight line L1 connecting the point A1 and the rotation axis C1. Although the outer corner 25*e* of the permanent magnet 25 is a portion which is most likely to be demagnetized, the demagnetization of the outer corner 25*e* is less likely to occur by disposing the outer corner 25*e* of the permanent magnet 25 as above.

As illustrated in FIG. 4, the outer corner 25*e* of the permanent magnet 25 is disposed inside the flux barrier 22 and is not in contact with the rotor core 20. Thus, the magnetic flux flowing through of the rotor core 20 is not likely to reach the outer corner 25*e* of the permanent magnet 25. As a result, the demagnetization of the outer corner 25*e* of the permanent magnet 25 is further less likely to occur.

(Reduction of Manufacturing Cost and Suppression of Demagnetization of Permanent Magnet)

Next, the manufacturing cost and suppression of demagnetization of the permanent magnet 25 will be described. The demagnetization characteristic of the permanent magnet 25 has a correlation to the thickness T1 of the permanent magnet 25. In general, as the thickness T1 of the permanent magnet 25 increases, the demagnetization is less likely to occur (in other words, resistance to demagnetization increases). As the thickness T1 of the permanent magnet 25 decreases, the demagnetization is more likely to occur (in other words, the resistance to demagnetization decreases).

On the other hand, as the thickness T1 of the permanent magnet 25 increases, the use amount of material increases, and thus the manufacturing cost increases. When the thickness T1 of the permanent magnet 25 is extremely thin, the use amount of material is reduced, but the processing cost increases. The increase in the processing cost exceeds the reduction in the material cost, which leads to an increase in the manufacturing cost.

Figure 6:
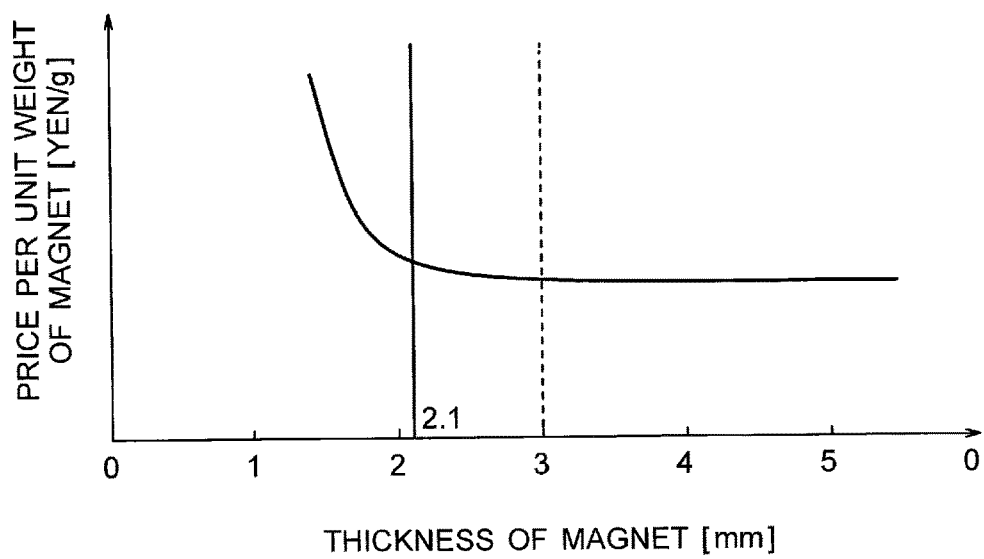
FIG. 6 is a graph illustrating a relationship between a thickness of a permanent magnet and a price per unit weight of the permanent magnet.

FIG. 6 is a graph illustrating a relationship between the thickness T1 (mm) of the permanent magnet 25 and a price per unit weight (Yen/g) of the permanent magnet 25. From FIG. 6, it is understood that, when the thickness T1 of the permanent magnet 25 is thinner than 2.1 mm, the price per unit weight (Yen/g) of the permanent magnet 25 increases dramatically due to an increase in the processing cost. Thus, it is desirable to suppress the demagnetization of the permanent magnet 25 while setting the thickness T1 of the permanent magnet 25 to be thicker than or equal to 2.1 mm.

The demagnetization of the permanent magnet 25 is caused by the magnetic flux from the stator 5, i.e., the magnetic flux generated by the current flowing through the coil 55. This magnetic flux is proportional to the product of the current flowing through the coil 55 and a winding number (the number of turns) Nt of the coil 55 wound around one tooth 51.

As the minimum gap AG between the rotor 2 and the stator 5 decreases, the magnetic flux from the stator 5 reaching the rotor 2 increases. As the minimum gap AG between the rotor 2 and the stator 5 increases, the magnetic flux from the stator 5 reaching the rotor 2 decreases.

Here, focus is placed on a value (Ip×Np/AG), which is obtained by dividing the product Ip×Nt of an overcurrent threshold Ip (A) and the winding number Nt of the coil 55 for one tooth 51, by the minimum gap AG (mm) between the rotor 2 and the stator 5. The overcurrent threshold Ip (A) is the maximum value of the current flowing through the coil 55. The unit of Ip×Nt/AG is A/mm.

The motor 1 is controlled by a drive device 101 (FIG. 10) to be described later so that the current flowing through the coil 55 does not exceed the overcurrent threshold (i.e., an overcurrent protection level). This overcurrent threshold is the above-described overcurrent threshold Ip. The overcurrent threshold is also referred to as an overcurrent cutoff value.

Figure 7:
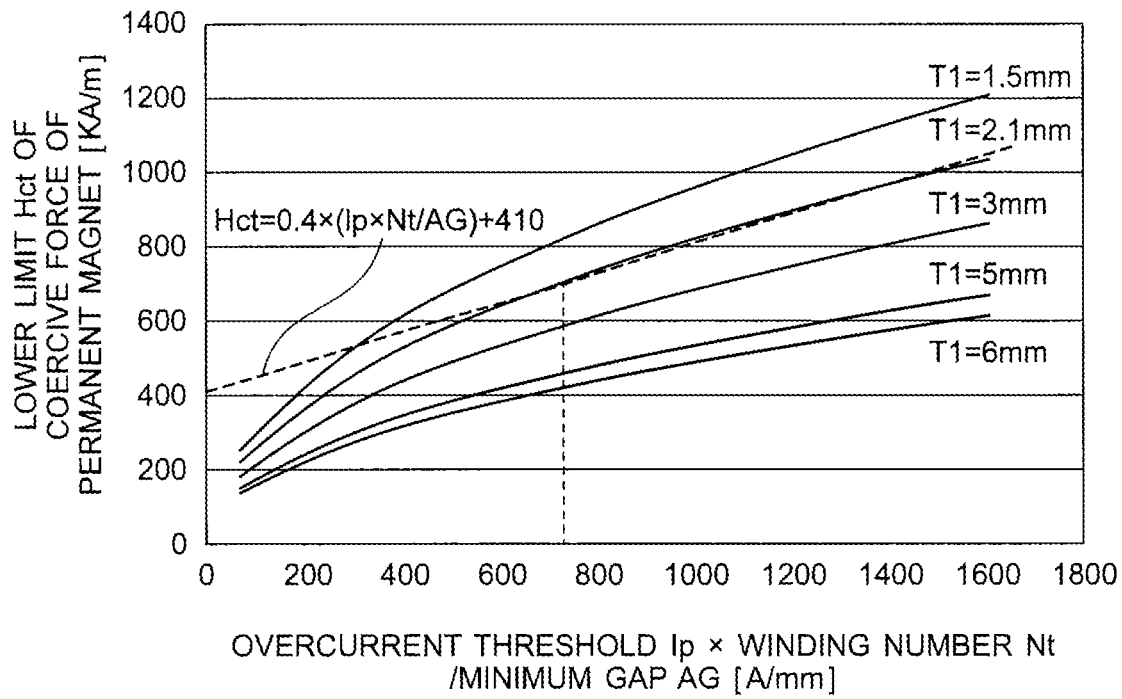
FIG. 7 is a graph illustrating a relationship between Ip×Nt/AG and a lower limit of a coercive force of the permanent magnet.

FIG. 7 is a graph illustrating a relationship between Ip×Nt/AG and a lower limit Hct (kA/m) of a coercive force of the permanent magnet 25. The coercive force refers to an intensity of the magnetic field at which the magnetic polarization of the permanent magnet 25 is zero in a magnetization curve (J-H curve).

The permanent magnet 25 formed of a rare earth magnet has characteristic such that its coercive force decreases as a temperature increases. When the motor 1 is used in a fan of an air conditioner, the temperature of the permanent magnet 25 increases to 100° C. Thus, the lower limit Hct of the coercive force is defined as the coercive force of the permanent magnet 25 when the temperature of the permanent magnet 25 is 100° C. (i.e., the highest temperature in an operating temperature range).

FIG. 7 shows data obtained when the thickness T1 of the permanent magnet 25 is changed to five different values, namely, 1.5 mm, 2.1 mm, 3 mm, 5 mm, and 6 mm. For example, in a case where the thickness T1 of the permanent magnet 25 is 2.1 mm, when the coordinates (Ip×Nt/AG, Hct) are on or above a curve for T1=2.1 mm, the demagnetization of the permanent magnet 25 does not occur. As the thickness T1 of the permanent magnet 25 increases, the demagnetization is less likely to occur. Thus, as the thickness T1 increases, the curve is located on the lower side.

From FIG. 7, it is understood that, in a region where Ip×Nt/AG is higher than or equal to 750 (A/mm), there is a linear functional relationship between Ip×Nt/AG and the lower limit Hct of the coercive force. In particular, the curve indicative of the data for the thickness T1 of 2.1 mm can be approximated by a straight line of Hct=0.4×(Ip×Nt/AG)+410 (indicated by a dashed line in FIG. 7).

From this, it is understood that the demagnetization of the permanent magnet 25 having the thickness T1 thicker than or equal to 2.1 mm can be suppressed when Hct≥0.4×(Ip×Nt/AG)+410 is satisfied. That is, by setting the thickness T1 of the permanent magnet 25 to be thicker than or equal to 2.1 mm, the demagnetization of the permanent magnet 25 can be suppressed while reducing the manufacturing cost.

As illustrated in FIG. 6 described above, when the thickness T1 of the permanent magnet 25 is thicker than or equal to 3 mm, the price per unit weight (yen/g) of the permanent magnet 25 is constant. Thus, it is more desirable to suppress demagnetization of the permanent magnet 25 while setting the thickness T1 of the permanent magnet 25 to be thicker than or equal to 3 mm.

Figure 8:
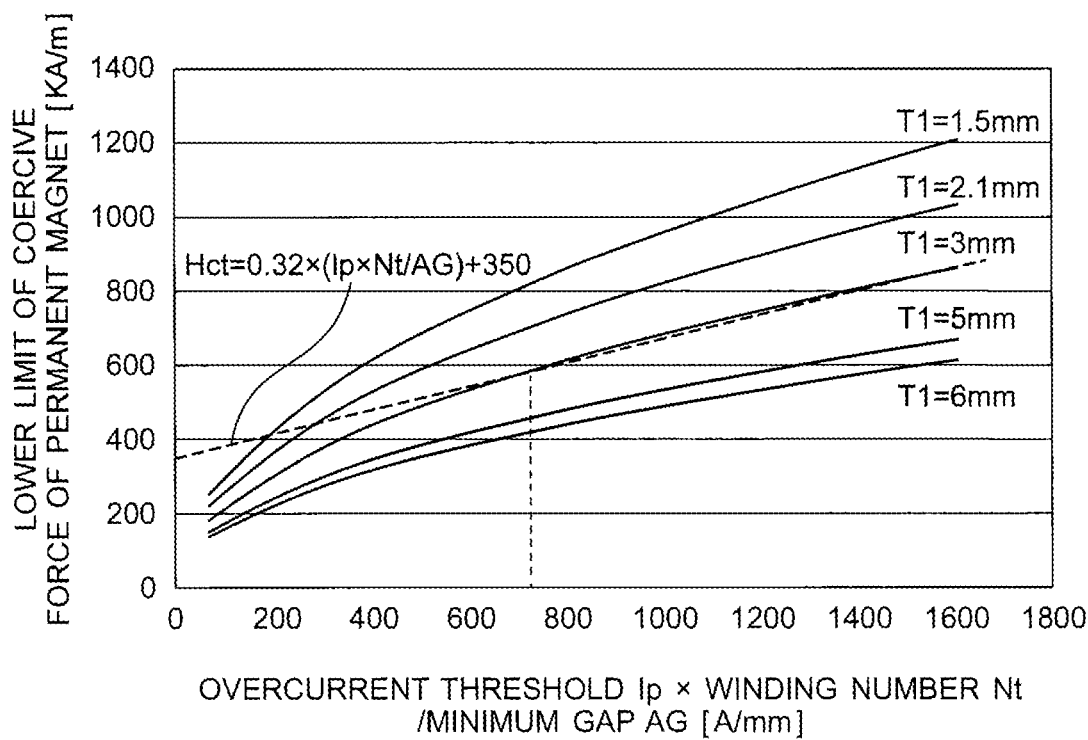
FIG. 8 is a graph illustrating a relationship between Ip×Nt/AG and the lower limit of the coercive force of the permanent magnet.

FIG. 8 is a graph in which the curve for the thickness T1 of 3 mm is approximated by a straight line in the same graph as FIG. 7. The respective curves indicating data when the thickness T1 of the permanent magnet 25 is 1.5 mm, 2.1 mm, 3 mm, 5 mm, and 6 mm are the same as those in FIG. 7. As illustrated in FIG. 8, the curve indicating the data for the thickness T1 of 3 mm can be approximated by a straight line of Hct=0.32×(Ip×Nt/AG)+350 in the region where Ip×Nt/AG is greater than or equal to 750 (A/mm).

From this, it is understood that the demagnetization of the permanent magnet 25 having the thickness T1 thicker than or equal to 3 mm can be suppressed when Hct≥0.32×(Ip×Nt/AG)+350 is satisfied. That is, by setting the thickness T1 of the permanent magnet 25 to be thicker than or equal to 3 mm, the manufacturing cost can be further reduced and the demagnetization of the permanent magnet 25 can be suppressed.

A portion of the permanent magnet 25 that is relatively likely to be demagnetized is the side end portions 25c where the magnetic flux is likely to concentrate. For this reason, as illustrated in FIG. 5, the side end portion 25c of the permanent magnet 25 is disposed on the straight line L1 connecting the point A1 on the outer circumferential portion 20b of the rotor core 20 and the rotation axis C1.

The air gap 10 between the rotor 2 and the stator 5 is a space and has a high magnetic resistance compared to the rotor core 20 formed of a magnetic material. Thus, the side end portion 25c of the permanent magnet 25 is disposed on the inner side of the outer circumferential portion 20b in the radial direction (i.e., on the straight line L1) via a wide space from the stator 5. This makes it difficult for the stator magnetic flux to flow to the side end portion 25c, so that the demagnetization of the side end portion 25c of the permanent magnet 25 can be made less likely to occur.

In particular, a portion of the permanent magnet 25 that is most likely to be demagnetized is the outer corner 25e of the side end portions 25c. For this reason, as illustrated in FIG. 4, the outer corner 25e of the permanent magnet 25 is desirably disposed on the straight line L1 connecting the point A1 on the outer circumferential portion 20b of the rotor core 20 and the rotation axis C1. This makes it difficult for the stator magnetic flux to flow to the outer corner 25e, so that the demagnetization of the outer corner 25e of the permanent magnet 25 can be made less likely to occur.

As illustrated in FIG. 4, the outer corner 25e of the permanent magnet 25 is disposed inside the flux barrier 22 and is not in contact with the rotor core 20. The flux barrier 22 is an opening and has a high magnetic resistance. Since the outer corner 25e of the permanent magnet 25 is surrounded by the opening, the magnetic flux flowing through the rotor core 20 is less likely to reach the outer corner 25e. As a result, the demagnetization of the outer corner 25e of the permanent magnet 25 can be made further less likely to occur.

(Thickness of Permanent Magnet)

As described above, the thickness T1 of the permanent magnet 25 is desirably thicker than or equal to 2.1 mm in order to reduce the manufacturing cost. Meanwhile, the permanent magnet 25 is generally magnetized in a state where the permanent magnet 25 is inserted into the magnet insertion hole 21 of the rotor core 20.

Figure 9:
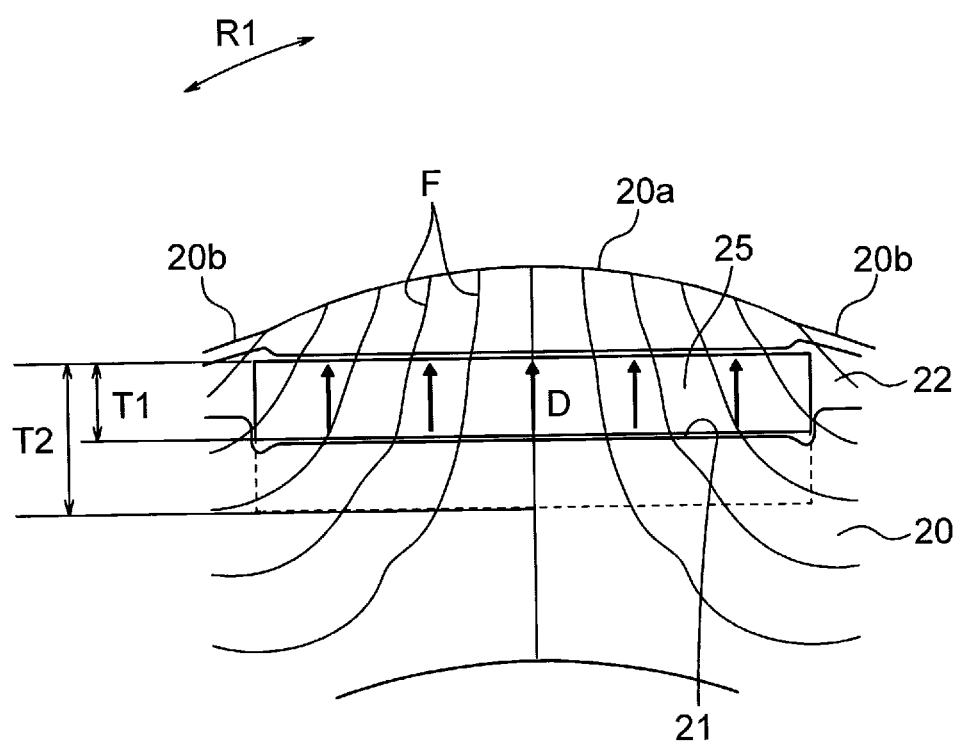
FIG. 9 is a schematic diagram for explaining the flow of a magnetization magnetic flux in the rotor.

FIG. 9 is a schematic diagram illustrating a magnetizing step of the permanent magnet 25. A magnetization magnetic flux F which is generated in a magnetization device disposed on the outer circumferential side of the rotor core 20 flows to the permanent magnet 25 in the magnet insertion hole 21 through the outer circumferential portion of the rotor core 20.

The magnetization direction D of the permanent magnet 25 is the thickness direction. Thus, only a component of the magnetization magnetic flux F in the thickness direction of the permanent magnet 25 contributes to the magnetization of the permanent magnet 25. In a case where the diameter of the rotor 2 is 50 mm, when the thickness of the permanent magnet 25 exceeds 4 mm (a thickness T2 illustrated in FIG. 9), the magnetization magnetic flux F passing through an inner region of the permanent magnet 25 in the radial direction is largely inclined with respect to the thickness direction, and thus magnetization of the inner side of the permanent magnet 25 in the radial direction is insufficient.

Thus, in order to sufficiently magnetize the permanent magnet 25, the thickness T1 of the permanent magnet 25 is desirably thinner than or equal to 4 mm.

(Drive Device of Motor)

Figure 10:
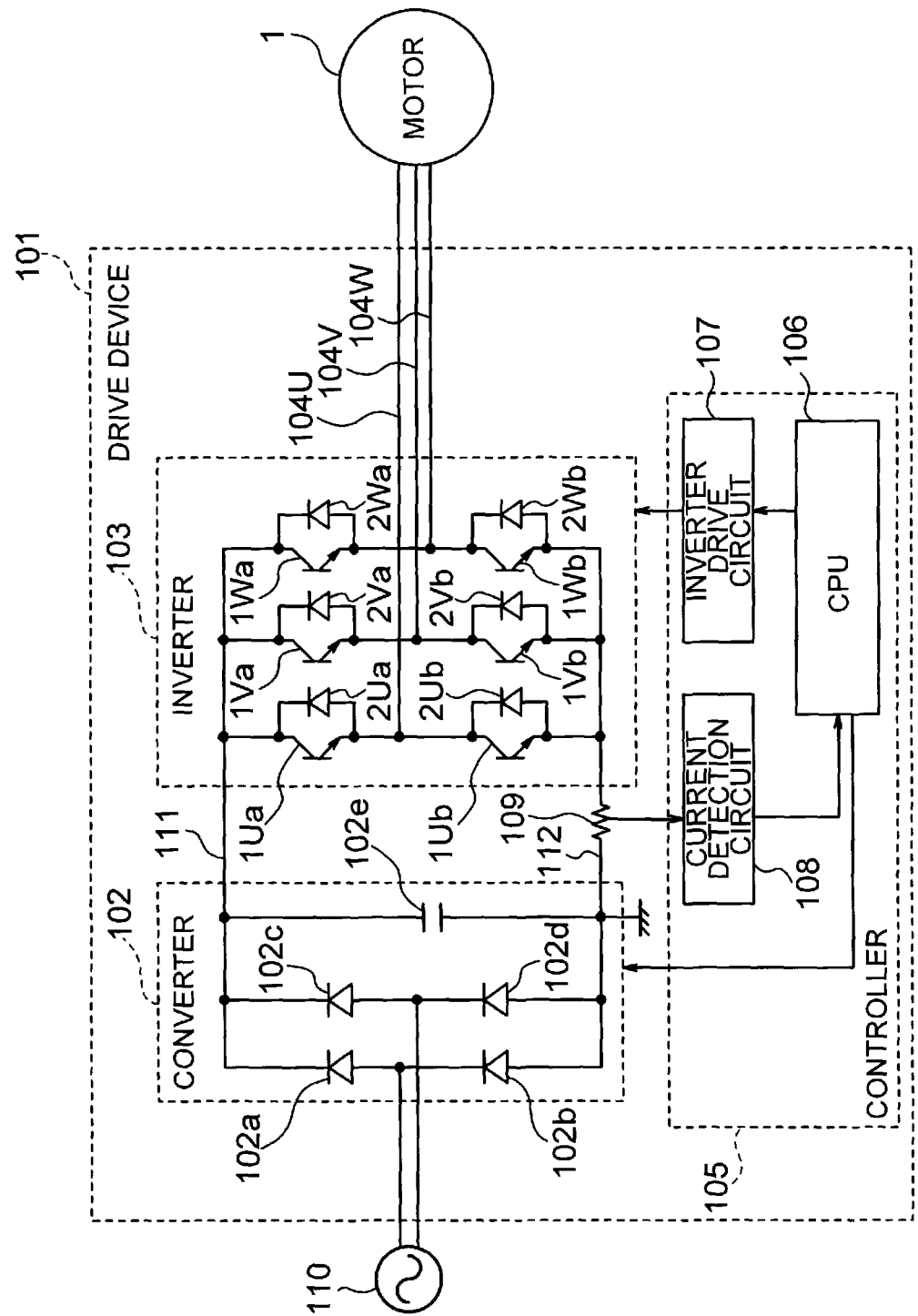
FIG. 10 is a block diagram illustrating a control system of the motor of the first embodiment.

Next, the drive device 101 that drives the motor 1 will be described. FIG. 10 is a block diagram illustrating a configuration of the drive device 101. The drive device 101 may be mounted on a board 7 (FIG. 14) incorporated in the motor 1 or may be provided outside the motor 1.

The drive device 101 has a converter 102 that rectifies an output of a power source 110, an inverter 103 that outputs an AC voltage to the coil 55 of the motor 1, and a controller 105 that controls these components. The power source 110 is, for example, an AC power source of 200 V (effective voltage).

The controller 105 has a current detection circuit 108 that detects a current value of the inverter 103, an inverter drive circuit 107 that drives the inverter 103, and a CPU 106 that serves as an inverter control unit.

The converter 102 is a rectifier circuit that receives an AC voltage from the power source 110, rectifies and smooths the voltage, and outputs the voltage through bus lines 111 and 112. The converter 102 has bridge diodes 102a, 102b, 102c, and 102d that rectify the AC voltage, and a smoothing capacitor 102e that smooths the output voltage. The voltage output from the converter 102 is referred to as a bus line voltage. The output voltage of the converter 102 is controlled by the controller 105.

The input terminals of the inverter 103 are connected to the bus lines 111 and 112 of the converter 102. Meanwhile, the output terminals of the inverter 103 are connected to three-phase coil portions of the motor 1 via U-phase, V-phase, and W-phase wirings (output wires) 104U, 104V, and 104W.

The inverter 103 has a U-phase switching element 1Ua corresponding to a U-phase upper arm, a U-phase switching element 1Ub corresponding to a U-phase lower arm, a V-phase switching element 1Va corresponding to a V-phase upper arm, a V-phase switching element 1Vb corresponding to a V-phase lower arm, a W-phase switching element 1Wa corresponding to a W-phase upper arm, and a W-phase switching element 1Wb corresponding to a W-phase lower arm.

The U-phase switching elements 1Ua and 1Ub are connected to the U-phase wiring 104U. A U-phase diode 2Ua is connected in parallel to the U-phase switching element 1Ua. A U-phase diode 2Ub is connected in parallel to the U-phase switching element 1Ub.

The V-phase switching elements 1Va and 1Vb are connected to the V-phase wiring 104V. A V-phase diode 2Va is connected in parallel to the V-phase switching element 1Va. A V-phase diode 2Vb is connected in parallel to the V-phase switching element 1Vb.

The W-phase switching elements 1Wa and 1Wb are connected to the W-phase wiring 104W. A W-phase diode 2Wa is connected in parallel to the W-phase switching element 1Wa. A W-phase diode 2Wb is connected in parallel to the W-phase switching element 1Wb.

Each of the switching elements 1Ua to 1Wb can be constituted by, for example, a transistor such as an Insulated-Gate Bipolar Transistor (IGBT). Switching of each of the switching elements 1Ua to 1Wb is controlled by a drive signal from the inverter drive circuit 107.

The inverter drive circuit 107 generates a drive signal for switching on and off each of the switching elements 1Ua to 1Wb of the inverter 103 based on a Pulse Width Modulation (PWM) signal input from the CPU 106, and outputs the drive signal to the inverter 103.

A resistor 109 is connected to an input side of the inverter 103 (for example, the bus line 112 from the converter 102), and the current detection circuit 108 is connected to the resistor 109. The current detection circuit 108 is a current detector that detects a current value of the current on the input side of the inverter 103 (i.e., the bus line current of the converter 102). In this example, a shunt resistor is used as the current detection circuit 108.

The CPU 106 as the inverter control unit controls the inverter 103. The CPU 106 outputs an inverter drive signal (a PWM signal) to the inverter 103 based on an operation instruction signal or the like from a remote controller of the air conditioner 500 or the like.

The CPU 106 detects the current value of the inverter 103 using the current detection circuit 108 and compares the detected current value with an overcurrent threshold stored in advance. When the detected current value is greater than or equal to the overcurrent threshold, a stopping signal is output to the inverter 103 to thereby stop the inverter 103 (that is, to stop the rotation of the motor 1). This overcurrent threshold is the overcurrent threshold Ip described above.

Effects of Embodiment

As described above, in the first embodiment, the permanent magnet 25 has the thickness T1 thicker than or equal to 2.1 mm, and the minimum gap AG between the rotor 2 and the stator 5, the winding number Nt of the coil 55 wound around the tooth 51, the overcurrent threshold Ip for the current flowing through the coil 55, and the lower limit Hct of the coercive force of the permanent magnet 25 satisfy Hct≥0.4×(Ip×Nt/AG)+410. This makes it possible to suppress demagnetization of the permanent magnet 25 while reducing the price per unit weight of the permanent magnet 25 to reduce the manufacturing cost.

Further, the permanent magnet 25 has the thickness T1 thicker than or equal to 3 mm, and the minimum gap AG between the rotor 2 and the stator 5, the winding number Nt of the coil 55 wound around the tooth 51, the overcurrent threshold Ip for the current flowing through the coil 55, and the lower limit Hct of the coercive force of the permanent magnet 25 satisfy Hct≥0.32×(Ip×Nt/AG)+350. This makes it possible to suppress demagnetization of the permanent magnet 25 while reducing the price per unit weight of the permanent magnet 25 to a further lower level to reduce the manufacturing cost.

By setting the thickness T1 of the permanent magnet 25 to be made less than or equal to 4 mm, the entire permanent magnet 25 can be sufficiently magnetized in a state where the permanent magnet 25 is inserted into the magnet insertion hole 21.

The outer circumference of the rotor core 20 has the outer circumferential portion 20a (i.e., the first outer circumferential portion) located at a shorter distance from the stator 5 and the outer circumferential portion 20b (i.e., the second outer circumferential portion) located at a longer distance from the stator 5, and the side end portion 25c of the permanent magnet 25 is disposed on the straight line connecting the point A1 (i.e., the first point) on the outer circumferential portion 20b and the rotation axis C1. This makes it difficult for the stator magnetic flux to flow to the side end portion 25c of the permanent magnet 25, and thus the demagnetization can be suppressed.

The corner (the outer corner 25e) on the outer side in the radial direction of the side end portion 25c of the permanent magnet 25 is disposed on the straight line connecting the point A1 on the outer circumferential portion 20b of the rotor core 20 and the rotation axis C1. This makes it difficult for the stator magnetic flux to flow to the outer corner 25e of the permanent magnet 25, and thus the effect of suppressing the demagnetization can be enhanced.

The outer corner 25e of the permanent magnet 25 is formed in the flux barrier 22 formed continuously with the magnet insertion hole 21 and is not in contact with the rotor core 20. This makes it difficult for the magnetic flux in the rotor core 20 to reach the outer corner 25e of the permanent magnet 25. Thus, the effect of suppressing the demagnetization can be further enhanced.

Second Embodiment

Next, a second embodiment of the present invention will be described. A motor 1A of the second embodiment differs from the motor 1 of the first embodiment in a configuration of the rotor 3. A stator of the motor 1A of the second embodiment has a configuration similar to that of the stator 5 of the motor 1 of the first embodiment.

(Configuration of Rotor)

Figure 11:
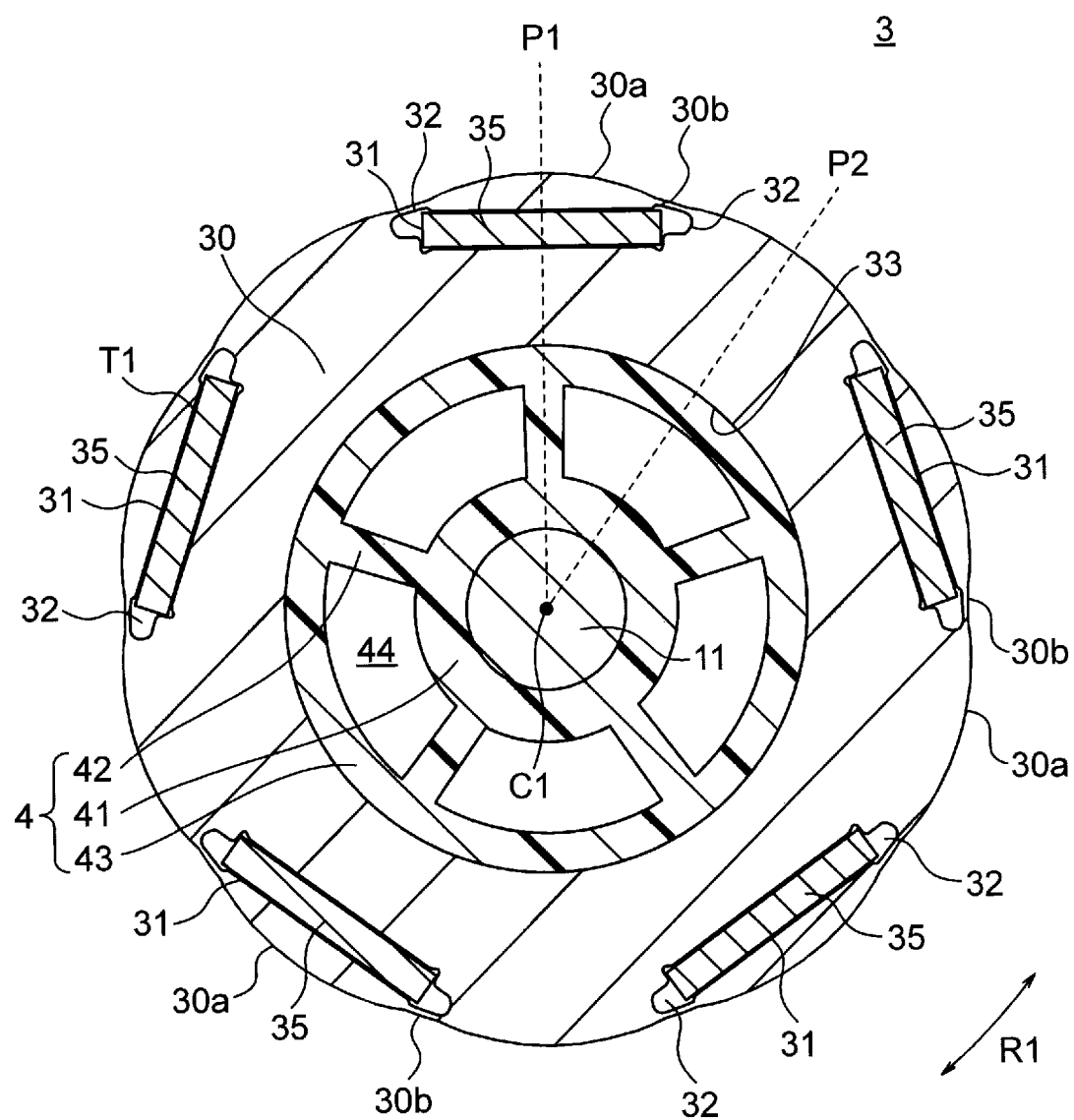
FIG. 11 is a cross-sectional view illustrating a rotor of a second embodiment.

FIG. 11 is a cross-sectional view illustrating a rotor 3 of the second embodiment. The rotor 3 has a rotor core 30 having a cylindrical shape about the rotation axis C1. The rotor core 30 is composed of a plurality of magnetic stack elements each having a thickness of 0.2 to 0.5 mm, which are stacked in the axial direction and fixed together by crimping or the like. A structure of the stack element is as described in the first embodiment.

A plurality of magnet insertion holes 31 are formed along an outer circumferential surface of the rotor core 30. The magnet insertion holes 31 are arranged at equal intervals in the circumferential direction. Each magnet insertion hole 31 has an elongated shape in the circumferential direction and passes through the rotor core 30 in the axial direction. The number of magnet insertion holes 31 is five in this example. A permanent magnet 35 is disposed in each magnet insertion hole 31.

The permanent magnet 35 disposed in each magnet insertion hole 31 constitutes a magnet magnetic pole P1. The permanent magnets 35 are arranged in such a manner that pole-faces of the same polarity (for example, N pole) face the outer circumferential side of the rotor core 30. Thus, a portion through which the magnetic flux flows in the radial direction is formed between adjacent permanent magnets 35 in the rotor core 30. That is, a pseudo-magnetic pole P2 whose polarity is opposite to that of the permanent magnet 35 is formed.

That is, the rotor 3 has five magnet magnetic poles P1 and five pseudo-magnetic poles P2, which are alternately arranged in the circumferential direction. Thus, the number of poles of the rotor 3 is ten. The motor having such a rotor configuration is referred to as a consequent pole type. The number of poles of the rotor 3 is not limited to ten.

The rotor core 30 has an inner circumference 33 of an annular shape. A resin portion 4 is provided on an inner side the rotor core 30 and serves as a supporting portion that supports the rotor core 30. The resin portion 4 supports the rotor core 30 with respect to the rotation shaft 11 and is formed of a non-magnetic material, more specifically, a thermoplastic resin such as polybutylene terephthalate (PBT). The resin portion 4 can be obtained by molding the rotor core 30 and the rotation shaft 11 with resin.

The resin portion 4 includes an inner cylindrical portion 41 fixed to the outer circumferential surface of the rotation shaft 11, an annular outer cylindrical portion 43 fixed to the inner circumference 33 of the rotor core 30, and a plurality of ribs (connecting portions) 42 connecting the inner cylindrical portion 41 and the outer cylindrical portion 43.

The rotation shaft 11 passes through the inner cylindrical portion 41 of the resin portion 4. The ribs 42 are arranged at equal intervals in the circumferential direction and radially extend from the inner cylindrical portion 41 toward the outer side in the radial direction. The position of each rib 42 in the circumferential direction corresponds to the center of the permanent magnet 35 in the circumferential direction (i.e., the pole center of the magnet magnetic pole P1). A hollow portion 44 is formed between ribs 42 adjacent to each other in the circumferential direction. The outer cylindrical portion 43 is formed to be continuous to outer ends in the radial direction of the ribs 42.

In the consequent pole type rotor 3, there is no permanent magnet in the pseudo-magnetic pole P2, and thus the magnetic flux passing through the pseudo-magnetic pole P2 is more likely to flow toward the rotation shaft 11. By providing the resin portion 4 between the rotor core 30 and the rotation shaft 11, the leakage magnetic flux to the rotation shaft 11 can be suppressed.

Figure 12:
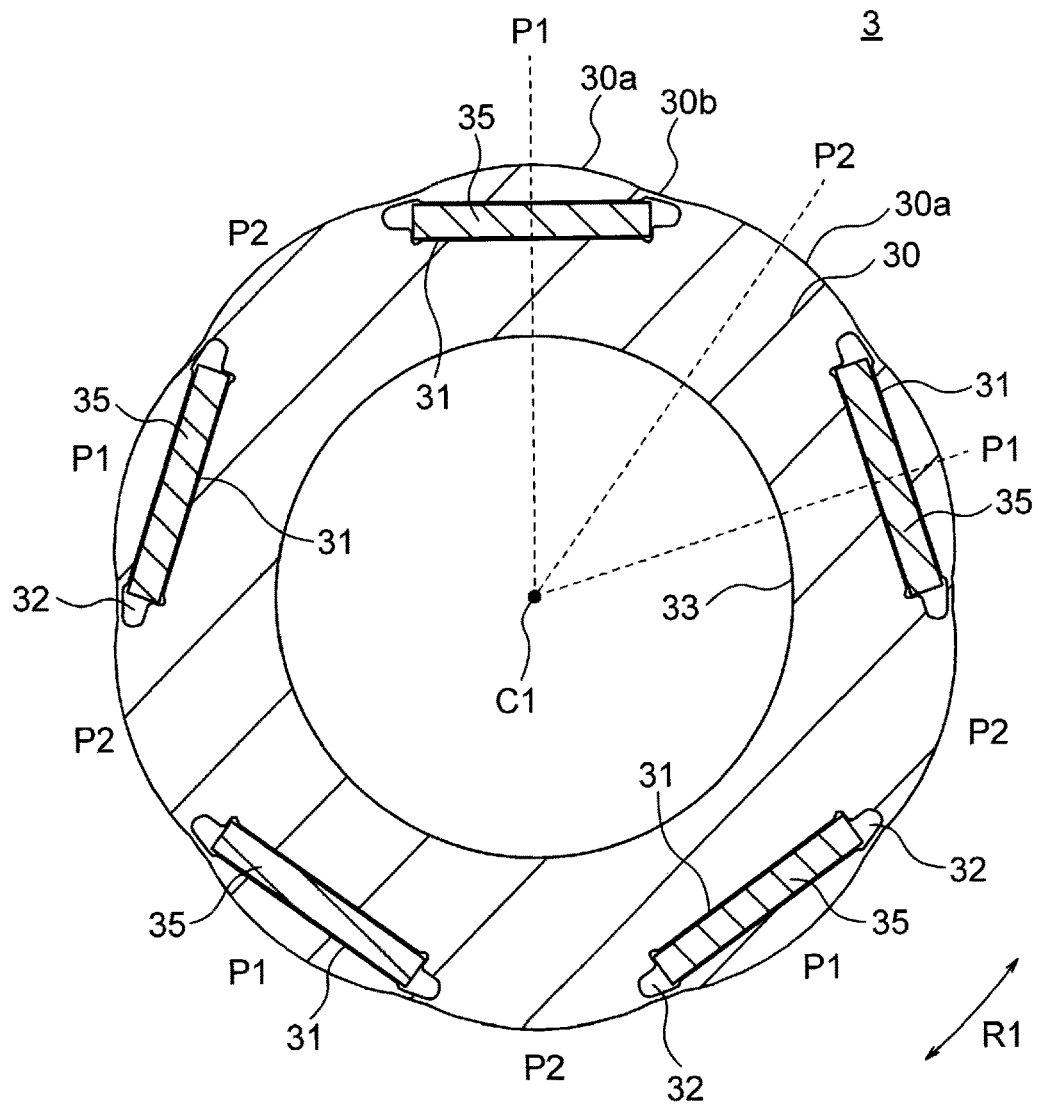
FIG. 12 is a cross-sectional view illustrating a part of the rotor of the second embodiment.

FIG. 12 is a cross-sectional view showing the rotor core 30 and the permanent magnet 35. In FIG. 12, the resin portion and the rotation shaft 11 are omitted. The outer circumference of the rotor core 30 has outer circumferential portions 30a (i.e., first center circumferential portions) whose centers are located at the pole centers of the magnetic poles (the magnet poles P1 and the pseudo-magnetic poles P2), and outer circumferential portions 30b (i.e., second outer circumferential portions) whose centers are located at the inter-pole portions. The outer circumferential portions 30a and 30b have the same shapes as the outer circumferential portions 20a and 20b described in the first embodiment, respectively.

The magnet insertion hole 31 has the same shape as the magnet insertion hole 21 of the first embodiment. Flux barriers 32 are formed on both sides of the magnet insertion hole 31 in the circumferential direction. The flux barrier 32 is provided for suppressing the leakage magnetic flux between the magnetic pole P1 and the pseudo-magnetic pole P2. The flux barrier 32 has the same shape as the flux barrier 22 of the first embodiment.

The permanent magnet 35 has the same structure as the permanent magnet 25 of the first embodiment. That is, the thickness of the permanent magnet 35 is thicker than or equal to 2.1 mm. The overcurrent threshold Ip (A) for the current flowing through the coil 55, the winding number Nt of the coil 55 for one tooth 51, the minimum gap AG (mm) between the rotor 3 and the stator 5, and the lower limit Hct of the coercive force of the permanent magnet 35 satisfy Hct≥0.4×(Ip×Nt/AG)+410.

The thickness of the permanent magnet 35 may be thicker than or equal to 3 mm. In this case, the overcurrent threshold Ip (A) for the current flowing through the coil 55, the winding number Nt of the coil 55 for one tooth 51, the minimum gap AG (mm) between the rotor 3 and the stator 5, and the lower limit Hct of the coercive force of the permanent magnet 35 satisfy Hct≥0.32×(Ip×Nt/AG)+350.

Thus, by setting the thickness T1 of the permanent magnet 35 to be thicker than or equal to 2.1 mm (or thicker than or equal to 3 mm), demagnetization of the permanent magnet 35 can be suppressed while reducing the manufacturing cost.

Figure 13:
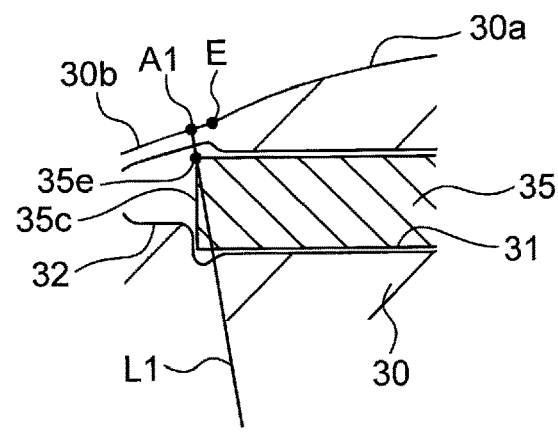
FIG. 13 is a schematic diagram for explaining a position of an end surface of the permanent magnet in the rotor of the second embodiment.

FIG. 13 is an enlarged diagram for explaining the position of a side end portion 35c of the permanent magnet 35. In FIG. 13, a straight line L1 is defined as a straight line connecting a point A1 on the outer circumferential portion 30b of the rotor core 30 and the rotation axis C1 (FIG. 12). The side end portion 35c of the permanent magnet 35 is located on the straight line L1. This makes it difficult for the stator magnetic flux to flow to the side end portions 35c of the permanent magnet 35, which is a portion where demagnetization is more likely to occur. Thus, the demagnetization can be suppressed.

More desirably, an outer corner 35e which is an outer corner in the radial direction of the side end portion 35c of the permanent magnet 35 is located on the straight line L1. This makes it difficult for the stator magnetic flux to flow to the outer corner 35e of the permanent magnet 35, which is a portion where the demagnetization is most likely to occur. Thus, the effect of suppressing the demagnetization is enhanced.

The outer corner 35e of the permanent magnet 35 is located inside the flux barrier 32 and is not in contact with the rotor core 30. Thus, the magnetic flux flowing through the rotor core 30 is less likely to reach the outer corner 35e of the permanent magnet 35. Thus, the effect of suppressing the demagnetization is enhanced.

(Configuration of Motor)

FIG. 14 is a side cross-sectional view showing a motor 1 of a second embodiment. The stator 5 is covered with a mold resin portion 60 to configure a mold stator 6.

The mold resin portion 60 is formed of, for example, a thermosetting resin such as a bulk molding compound (BMC). The mold resin portion 60 has an opening 62 on the left side (a load side to be described later) in FIG. 14 and a bearing supporting portion 61 located on the side opposite to the opening 62 (a counter-load side to be described later). The rotor 3 is inserted through the opening 62 into a hollow portion inside the stator 5.

A metal bracket 15 is mounted to the opening 62 of the mold resin portion 60. One bearing 12 that supports the rotation shaft 11 is held by the bracket 15. A cap 14 that prevents water or the like from intruding into the bearing 12 is attached to the outside of the bracket 15. The other bearing 13 that supports the rotation shaft 11 is held by the bearing supporting portion 61.

The rotation shaft 11 protrudes from the stator 5 to the left side in FIG. 14. For example, an impeller of a fan is attached to a tip end 11a of the rotation shaft 11. Thus, the protruding side (the left side in FIG. 14) of the rotation shaft 11 is referred to as the "load side", whereas the side opposite to the load side (the right side in FIG. 14) is referred to as the "counter-load side".

The board 7 is disposed on the counter-load side of the stator 5. A drive circuit 72 for driving the motor 1 and a magnetic sensor 71 are mounted on the board 7. The magnetic sensor 71 is disposed so as to face a sensor magnet 36 attached to the rotor 3. The drive circuit 72 is the drive device 101 illustrated in FIG. 10. Alternatively, the drive circuit 72 can be provided outside the motor 1, instead of being provided on the board 7.

Lead wires 73 are wired on the board 7. The lead wires 73 include power source lead wires for supplying power to the coil 55 of the stator 5 and sensor lead wires for transmitting a signal from the magnetic sensor 71 to the outside. A lead wire outlet 74 for drawing out the lead wires 73 to the outside is attached to an outer circumferential portion of the mold resin portion 60.

The resin portion 4 described above is provided on an inner circumferential side of the rotor core 30, and also covers both end surfaces of the rotor core 30 in the axial direction. A part of the resin portion 4 is desirably inserted into the magnet insertion hole 31. This prevents the permanent magnet 35 from dropping out of the magnet insertion hole 31.

The sensor magnet (i.e., a position detecting magnet) 36 having an annular shape is attached to the rotor core 30. The sensor magnet 36 is disposed on the side of the rotor core 30 that faces the board 7 in the axial direction and held so as to be surrounded by the resin portion 4. The sensor magnet 36 has magnetic poles the number of which is the same as the number of poles of the rotors 3, and the magnetic poles are arranged at equal intervals in the circumferential direction. The magnetization direction of the sensor magnet 36 is the axial direction but is not limited thereto.

The magnetic sensor 71 is constituted by, for example, a Hall IC and disposed so as to face the sensor magnet 36 of the rotor 3. The magnetic sensor 71 detects a position (i.e., a rotational position) of the rotor 3 in the circumferential direction based on a change in the magnetic flux (N/S) from the sensor magnet 36, and outputs a detection signal. The magnetic sensor 71 is not limited to the Hall IC but may also be a Magneto-Resistive (MR) device, a Giant-Magneto-Resistive (GMR) device, or a magnetic impedance device.

The detection signal of the magnetic sensor 71 is output to the drive circuit 72. When the drive circuit 72 is disposed outside the motor 1, the detection signal of the magnetic sensor 71 is output to the drive circuit 72 via the sensor lead wires. The drive circuit 72 controls the current flowing through the coil 55 according to the rotational position of the rotor 3 relative to the stator 5, based on the detection signal from the magnetic sensor 71.

Here, description has been made of an example in which the sensor magnet 36 and the magnetic sensor 71 are used to detect the rotational position of the rotor 3, but it is possible to perform sensor-less control in which the rotational position of the rotor 3 is detected based on the current flowing through the coil 55 or the like.

Here, description has been made of a configuration in which the stator 5 is covered with the mold resin portion 60, but it is also possible to employ a configuration in which the stator 5 is fixed by shrink-fitting into the inside of a shell. The configuration of the motor 1A described with reference to FIG. 14 is also applied to the motor 1 of the first embodiment except for the rotor 3 and the resin portion 4.

Figure 15:
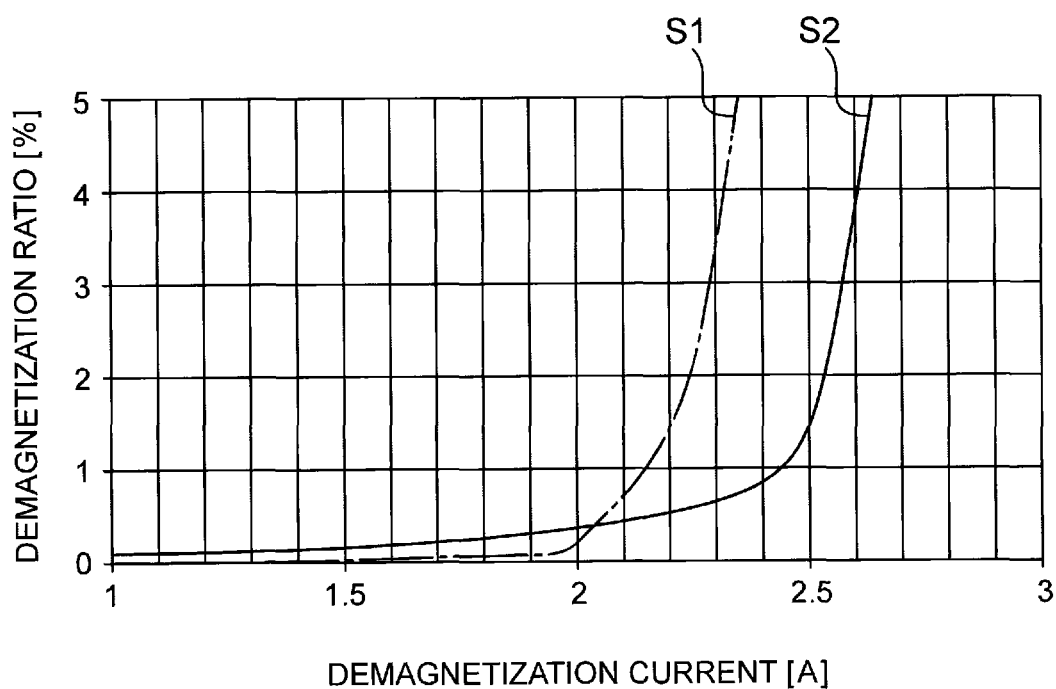
FIG. 15 is a graph illustrating a relationship between demagnetization current and a demagnetization ratio in the motor of the second embodiment.

FIG. 15 is a graph illustrating changes in the demagnetization ratio with respect to the demagnetization current in the motor 1 of the first embodiment and the motor 1A of the second embodiment in comparison to each other. In FIG. 15, a curve S1 indicates data for the motor 1 of the first embodiment, and a curve S2 indicates data for the motor 1A of the second embodiment. The demagnetization current refers to a current which flows through the coil 55 to generate a stator magnetic flux.

Since the motor 1A of the second embodiment has the consequent pole type rotor 3, the number of permanent magnets 35 is smaller than that of the motor 1 in the first embodiment. Thus, portions demagnetized by the stator magnetic flux are small in number, and therefore the demagnetization of the permanent magnets 35 is less likely to occur. As a result, in the motor 1A of the second embodiment, an increase in the demagnetization ratio with an increase in the demagnetization current is reduced to a lower level than that in the motor 1 of the first embodiment.

Effects of Embodiment

As described above, in the motor 1A of the second embodiment, the rotor 3 is of the consequent pole type and the permanent magnets 35 are small in number, and portions where demagnetization occurs are small in number. Therefore, demagnetization of the permanent magnets 35 can be effectively prevented, in addition to the effects described in the first embodiment.

The resin portion 4 (i.e., the supporting portion) formed of non-magnetic material is provided between the rotor core 30 and the rotation shaft 11, and thus it is possible to suppress the leakage magnetic flux to the rotation shaft 11 which tends to occur in the consequent pole type rotor.

Although the resin portion 4 is provided between the rotor core 30 and the rotation shaft 11 in this example, it is also possible to directly fix the rotation shaft 11 to the rotor core 30 without providing the resin portion 4, like the rotor core 20 (FIG. 2) of the first embodiment. The resin portion 4 as in the second embodiment may be provided between the rotor core 20 and the rotation shaft 11 of the first embodiment.

(Air Conditioner)

Next, an air conditioner to which the motor of each of the embodiments described above is applied will be described. FIG. 16(A) is a diagram illustrating a configuration of an air conditioner 500 to which the motor of each embodiment is applicable. The air conditioner 500 includes an outdoor unit 501, an indoor unit 502, and a refrigerant pipe 503 connecting these units. The outdoor unit 501 has a fan (i.e., an outdoor fan) 510.

FIG. 16(B) is a cross-sectional view taken along the line 16B-16B illustrated in FIG. 16(A). The outdoor unit 501 has a housing 508 and a frame 509 fixed within the housing 508. The motor 1 serving as a drive source of the fan 510 is fixed to the frame 509 by screws or the like. An impeller (blade portion) 511 is attached to the rotation shaft 11 of the motor 1 via a hub 512.

Figure 17:
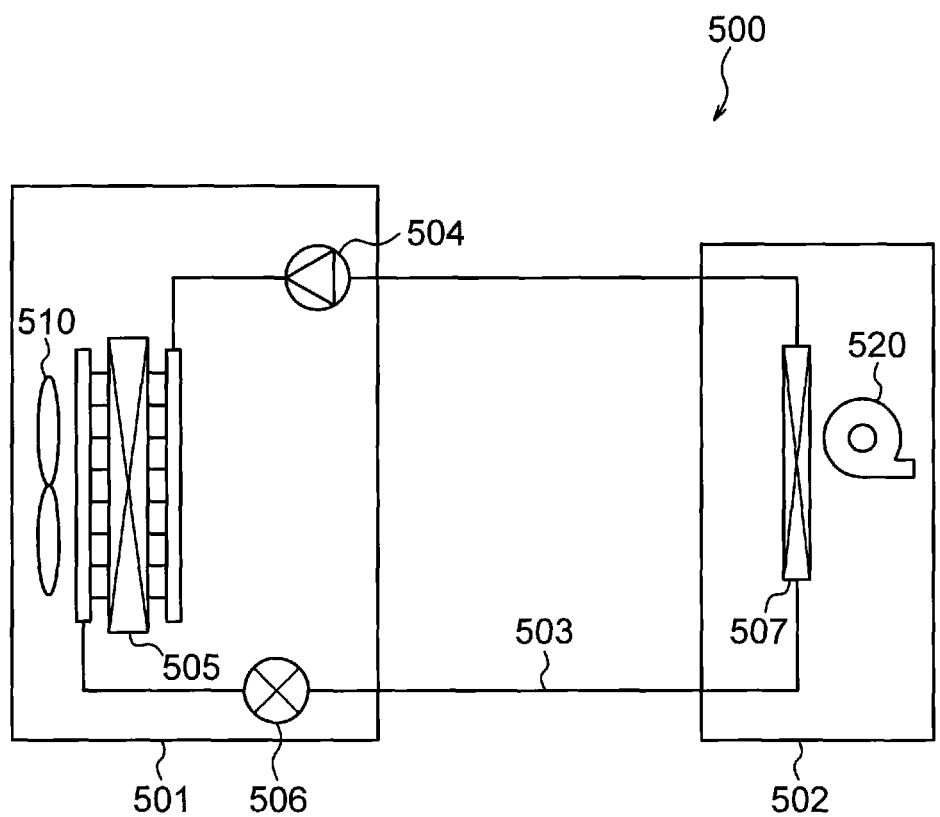
FIG. 17 is a schematic diagram illustrating a refrigerant circuit of the air conditioner illustrated in FIG. 16(A).

FIG. 17 is a schematic diagram illustrating a refrigerant circuit in the air conditioner 500. The air conditioner 500 includes a compressor 504, a condenser 505, a throttle device (a decompression device) 506, and an evaporator 507. The compressor 504, the condenser 505, the throttle device 506, and the evaporator 507 are connected by the refrigerant pipe 503 to constitute a refrigeration cycle. That is, the refrigerant circulates through the compressor 504, the condenser 505, the throttle device 506, and the evaporator 507 in this order.

The compressor 504, the condenser 505, and the throttle device 506 are provided in the outdoor unit 501. The evaporator 507 is provided in the indoor unit 502. A fan (i.e., an indoor fan) 520 that supplies indoor air to the evaporator 507 is provided in the indoor unit 502.

The operation of the air conditioner 500 is as follows. The compressor 504 compresses sucked refrigerant and sends out the compressed refrigerant. The condenser 505 exchanges heat between the refrigerant flowing in from the compressor 504 and the outdoor air to condense and liquefy the refrigerant and sends out the liquefied refrigerant to the refrigerant pipe 503. The fan 510 of the outdoor unit 501 releases heat dissipated when the refrigerant is condensed in the condenser 505, to the outside of a room. The throttle device 506 adjusts the pressure or the like of the refrigerant flowing through the refrigerant pipe 503.

The evaporator 507 exchanges heat between the refrigerant brought into a low-pressure state by the throttle device 506 and the indoor air to cause the refrigerant to take heat from the air and evaporate (vaporize), and then sends out the evaporated refrigerant to the refrigerant pipe 503. The fan 520 of the indoor unit 502 supplies the air (i.e., cooled air) from which heat is removed by the evaporator 507, to the inside of the room.

The motors 1 and 1A of the respective embodiments described above are configured to suppress demagnetization of the permanent magnets 25 and 35, respectively. Thus, by using the motor 1 as a power source of the fan 510, the operation efficiency of the air conditioner 500 can be enhanced for a long time period, and the energy consumption can be reduced.

Although each of the motors 1 and 1A of the embodiments is used as the drive source of the fan (i.e., the outdoor fan) 510 of the outdoor unit 501, it may be used as a drive source of a fan (i.e., an indoor fan) 520 of the indoor unit 502. Each of the motors 1 and 1A of the embodiments is not limited to the drive source for the fan but may be used as a drive source of the compressor 504, for example.

The motors 1 and 1A of the respective embodiments are not limited to the motors for the air conditioner 500, but may be used as motors for ventilation fans, household appliances or machine tools, for example.

Although the desirable embodiments of the present invention have been specifically described, the present invention is not limited to the above-described embodiments, and various modifications or changes can be made to the embodiments without departing from the scope of the present invention.

What is claimed is:

1. A motor comprising:
a rotor having a rotor core having a magnet insertion hole, and a permanent magnet disposed in the magnet insertion hole, the rotor being rotatable about a rotation axis; and
a stator provided so as to surround the rotor, the stator having a stator core having a tooth facing the rotor, and a coil wound around the tooth,
wherein the permanent magnet has a thickness thicker than or equal to 2.1 mm in a direction in a direction in which the permanent magnet faces the stator and is magnetized in a direction of the thickness, and
wherein a minimum gap AG (mm) between the rotor and the stator, a winding number Nt of the coil around the tooth, an overcurrent threshold Ip (A) for a current flowing through the coil, and a coercive force Hct (kA/m) of the permanent magnet at a highest temperature in an operating temperature range of the motor satisfy:

$$Hct \geq 0.4 \times (Ip \times Nt/AG) + 410.$$

2. A motor comprising:
a rotor having a rotor core having a magnet insertion hole, and a permanent magnet disposed in the magnet insertion hole, the rotor being rotatable about a rotation axis; and
a stator provided so as to surround the rotor, the stator having a stator core having a tooth facing the rotor, and a coil wound around the tooth,
wherein the permanent magnet has a thickness thicker than or equal to 3 mm in a direction in which the permanent magnet faces the stator and is magnetized in a direction of the thickness, and wherein a minimum gap AG (mm) between the rotor and the stator, a winding number Nt of the coil around the tooth, an overcurrent threshold Ip (A) for a current flowing through the coil, and a coercive force Hct (kA/m) of the permanent magnet at a highest temperature in an operating temperature range of the motor satisfy:

$$Hct \geq 0.32 \times (Ip \times Nt/AG) + 350.$$

3. The motor according to claim 1, wherein the thickness of the permanent magnet is thinner than or equal to 4 mm.

4. The motor according to claim 1, wherein the rotor has a pole center at a center of the magnet insertion hole in a circumferential direction about the rotation axis and an inter-pole portion on an outer side of the magnet insertion hole in the circumferential direction, wherein an outer circumference of the rotor has a first outer circumferential portion extending through the pole center and a second outer circumferential portion extending through the inter-pole portion, and wherein a distance from the first outer circumferential portion to the stator is shorter than a distance from the second outer circumferential portion to the stator.

5. The motor according to claim 4, wherein an end portion of the permanent magnet in the circumferential direction is located on a straight line connecting a first point on the second outer circumferential portion and the rotation axis.

6. The motor according to claim 4, wherein an outer corner in a radial direction about the rotation axis of an end portion of the permanent magnet in the circumferential direction is located on a straight line connecting a first point on the second outer circumferential portion and the rotation axis.

7. The motor according to claim 1, wherein the rotor has an opening connected to the magnet insertion hole on at least one side of the magnet insertion hole in the circumferential direction, and wherein an outer corner in a radial direction about the rotation axis of an end portion of the permanent magnet in the circumferential direction is located inside the opening and is not in contact with the rotor core.

8. The motor according to claim 1, wherein
a first magnetic pole is constituted by the permanent magnet, and wherein a second magnetic pole is constituted by a part of the rotor core.

9. The motor according to claim 8, further comprising:
a rotation shaft; and
a supporting portion provided between the rotation shaft and the rotor core and formed of non-magnetic material.

10. The motor according to claim 1, wherein a value of Ip×Nt/AG is greater than or equal to 750 A/mm.

11. The motor according to claim 1, further comprising:
an inverter supplying a current to the coil, and
a controller controlling the inverter,
wherein the controller stops the inverter when a current value of the inverter exceeds the overcurrent threshold.

12. A fan comprising:
the motor according to claim 1, and
a blade portion driven to rotate by the motor.

13. An air conditioner comprising an outdoor unit, an indoor unit, and a refrigerant pipe connecting the outdoor unit and the indoor unit,
wherein at least one of the outdoor unit and the indoor unit comprises the fan according to claim 12.

* * * * *